US011856890B2

(12) United States Patent
Burnley et al.

(10) Patent No.: US 11,856,890 B2
(45) Date of Patent: Jan. 2, 2024

(54) AUTOMATED TURN PATTERNS IN AN AGRICULTURAL HARVESTER

(71) Applicant: Deere & Company, Moline, IL (US)

(72) Inventors: Ryan C. Burnley, Ankeny, IA (US); Michael A. Torzewski, Waukee, IA (US); Ajit K. Thankappan Pillai, West Des Moines, IA (US)

(73) Assignee: Deere & Company, Moline, IL (US)

( * ) Notice: Subject to any disclaimer, the term of this patent is extended or adjusted under 35 U.S.C. 154(b) by 100 days.

(21) Appl. No.: 17/506,131

(22) Filed: Oct. 20, 2021

(65) Prior Publication Data

US 2023/0119306 A1   Apr. 20, 2023

(51) Int. Cl.
*A01D 41/127* (2006.01)
*G05D 1/02* (2020.01)

(52) U.S. Cl.
CPC ....... *A01D 41/1278* (2013.01); *G05D 1/0212* (2013.01); *G05D 2201/0201* (2013.01)

(58) Field of Classification Search
CPC ............. A01D 41/1278; G05D 1/0212; G05D 2201/0201
USPC ......................................................... 701/23
See application file for complete search history.

(56) References Cited

U.S. PATENT DOCUMENTS

| | | | |
|---|---|---|---|
| 10,542,666 B2 | 1/2020 | Connell et al. | |
| 11,032,967 B2 | 6/2021 | Connell et al. | |
| 11,112,262 B2 | 9/2021 | Anderson et al. | |
| 11,589,509 B2* | 2/2023 | Vandike | A01D 69/00 |
| 2005/0197766 A1* | 9/2005 | Flann | G05D 1/0219 340/995.19 |
| 2009/0037041 A1* | 2/2009 | Senneff | A01B 69/008 701/23 |
| 2018/0232674 A1 | 8/2018 | Bilde | |
| 2018/0321683 A1* | 11/2018 | Foster | G05D 1/0221 |
| 2019/0353483 A1* | 11/2019 | Liu | A01B 69/008 |
| 2020/0064144 A1* | 2/2020 | Tomita | A01D 69/00 |
| 2021/0302962 A1* | 9/2021 | Sakaguchi | G05D 1/0088 |
| 2021/0321554 A1* | 10/2021 | Liu | A01C 21/005 |
| 2021/0339768 A1* | 11/2021 | Kakkar | G05D 1/0212 |
| 2021/0357664 A1* | 11/2021 | Kocer | G05D 1/0282 |
| 2022/0087092 A1* | 3/2022 | Nakabayashi | G05D 1/0223 |

FOREIGN PATENT DOCUMENTS

| | | |
|---|---|---|
| EP | 3557360 A1 | 10/2019 |
| EP | 3571912 A1 | 11/2019 |

OTHER PUBLICATIONS

Extended European Search Report and Written Opinion issued in European Patent Application No. 22197608.7, dated Feb. 24, 2023, in 08 pages.

* cited by examiner

*Primary Examiner* — Yazan A Soofi
(74) *Attorney, Agent, or Firm* — Joseph R. Kelly; Kelly, Holt & Christenson PLLC

(57) ABSTRACT

An agricultural system automatically detects a turn pattern and automatically identifies a next path that will be taken through the field. The agricultural system automatically controls the machine through the next turn that navigates the machine from a current path to the identified next path. This continues until a land size has been completed at which point the agricultural system identifies a next land in a field.

19 Claims, 29 Drawing Sheets

AUTOMATED TURN PATTERNS IN AN AGRICULTURAL HARVESTER

FIELD OF THE DESCRIPTION

The present description relates to agricultural equipment. More specifically, the present description relates to automatically controlling turns in an agricultural machine.

BACKGROUND

There are a wide variety of different types of agricultural machines. Some such machines include agricultural harvesters, such as combine harvesters, cotton harvesters, forage harvesters, among others.

Some such harvesters include guidance systems that allow operators to define a path for the machine which is then automatically navigated along the path. Some such guidance systems allow the machine to be automatically guided from one pass through the field to another pass through the field through a turn that is defined by the operator.

These types of guidance systems are often useful on machines that make passes through the field by making alternating turns. Such machines can include, for instance, tillage machines which make a pass through a field then turn to the left and make another pass, then turn to the right and make another pass, and so on.

The discussion above is merely provided for general background information and is not intended to be used as an aid in determining the scope of the claimed subject matter.

SUMMARY

An agricultural system automatically detects a turn pattern and automatically identifies a next path that will be taken through the field. The agricultural system automatically controls the machine through the next turn that navigates the machine from a current path to the identified next path. This continues until a land size has been completed at which point the agricultural system identifies a next land in a field.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, some guidance systems allow an operator of a machine to define a path and the guidance system automatically navigates the machine along the path. Some such guidance systems also allow a user to define turns (such as U-turns) through which the machine may be navigated. These types of guidance systems encounter difficulty in scenarios other than when the machine simply makes alternating turns through the field (such as a tillage operation in which the tractor first turns to the left, then turns to the right, then turns to the left, etc. to work the field from one end to the other).

For instance, when harvesting corn, a combine harvester often has an unload auger that is only positionable over one side of the combine harvester. Therefore, in order to perform unloading while harvesting, the combine harvester must be controlled so that the unloading auger is always over an already-harvested portion of the machine (except, perhaps, during an initial pass opening up a field or a land). This ensures that a grain cart can always operate next to the combine harvester without running over crop.

Therefore, during such harvesting operations the machine is controlled through a different series of turns (through a turn pattern) in order to keep the unloading auger over a previously worked area.

Also, some harvesting operations are performed by navigating the harvester through "lands", or sections of the field made up of some number of passes. Some current machine operators struggle to identify the correct guidance path to cut into the field to begin harvesting a land. If chosen incorrectly, the land can lead to inefficiencies by way of extra passes being required to harvest all of the crops.

The present description thus proceeds with respect to a system that allows an operator to specify a desired turn pattern and land size, or alternatively allows the machine to learn a turn pattern and land size. For the pattern and land size that has been selected or learned, the system automatically determines the next path through the field by analyzing crop coverage data and the system generates signals to control the machine through the turn pattern until the land is completed, at which point, in one example, the system can identify a next land and a path for starting that next land.

Figure 1:
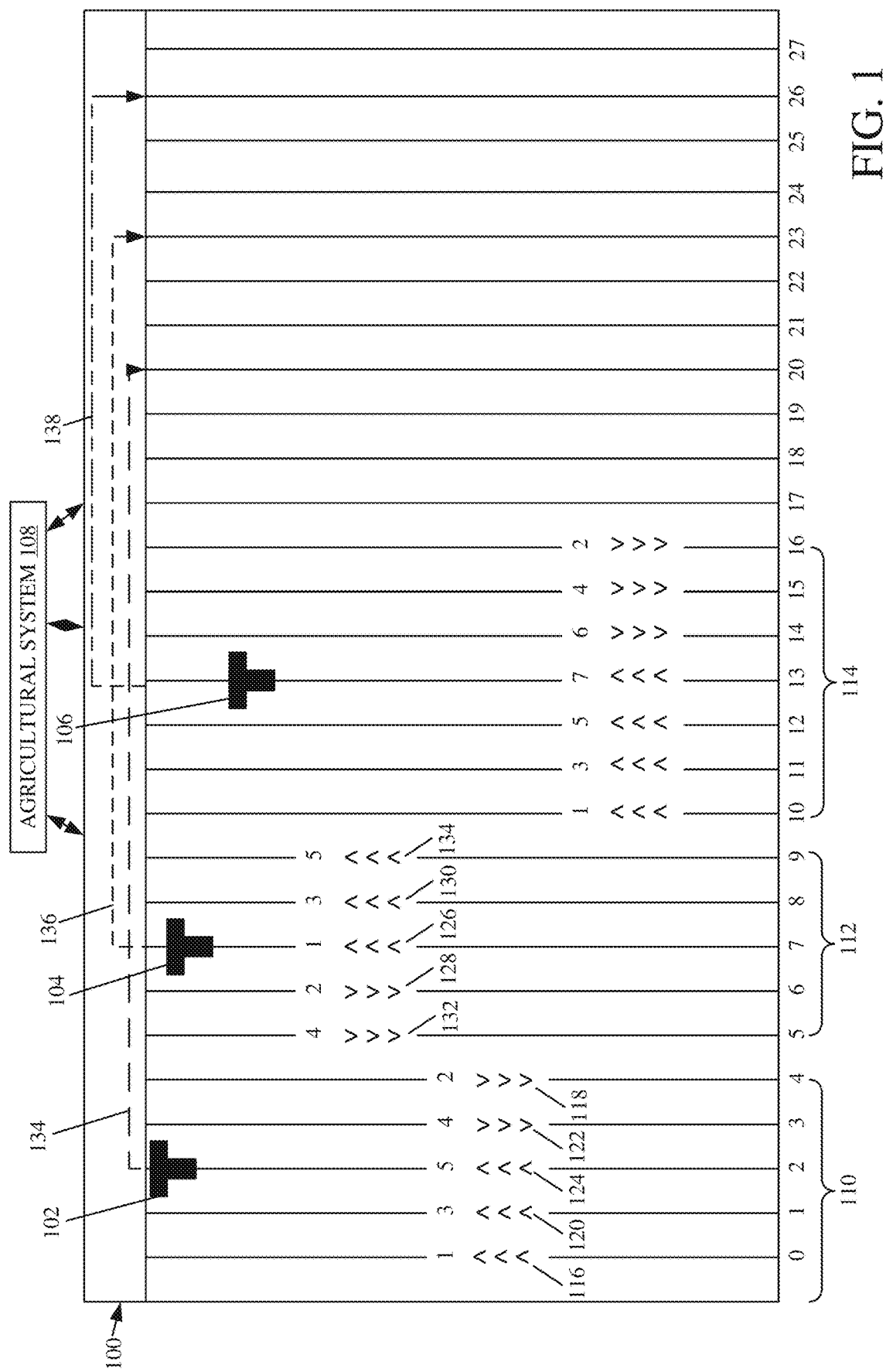
FIG. 1 illustrates one example of a plurality of harvesters harvesting lands in a field.

FIG. 1 shows one example of a field 100 in which a plurality of harvesters 102, 104, and 106 are working to perform a harvesting operation. FIG. 1 also shows an agricultural system 108 which can be deployed on each of harvesters 102, 104, and 106 or distributed across harvesters 102, 104, and 106, or deployed in a cloud computing system or another remote server architecture or distributed in other ways. The portion of the field 100 shown in FIG. 1 includes twenty-eight navigation paths (paths 0-27). Harvester 102 is shown harvesting a land 110 which includes navigation paths 0-4. Harvester 104 is shown harvesting a land 112 which includes navigation paths 5-9. Harvester 106 is shown harvesting a land 114 which includes navigation paths 10-16. Harvester 102 is harvesting the land 110 in a spiral in pattern so that the first navigation pass through land 110 is along navigation path 0 in the direction indicated by arrows 116. The second pass through land 110 is along navigation path 4 in the direction indicated by arrows 118. The third pass through land 110 is along navigation path 1 in the direction indicated by arrows 120. The fourth pass through land 110 is along navigation path 3 in the direction indicated by arrow 122 and the fifth pass through land 110 is along navigation path 2 in the direction indicated by arrows 124.

Harvester 104 is shown harvesting land 112 in a spiral out pattern in which the first pass through land 112 along navigation path 7 in the direction indicated by arrows 126. The second pass is along navigation path 6 in the direction indicated by arrows 128. The third pass through land 112 is along navigation path 8 in the direction indicated by arrows 130. The fourth pass is along navigation path 5 in the direction indicated by arrows 132 and the fifth pass through land 112 is along navigation path 9 in the direction indicated by arrows 134. Therefore, it can be seen that lands 110 and 112 are the same size, each including five navigation paths through field 100.

FIG. 1 also shows that harvester 106 is harvesting land 114 which includes 7 harvesting paths (harvesting paths 10-16) and the passes and directions through land 114 are indicated by the numerals and arrows in a similar way to those shown in lands 110 and 112.

Agricultural system 108 illustratively provides functionality that allows the operator in each harvester 102, 104, and 106 to specify a turn pattern (such as spiral in or spiral out) and a land size (such as the number of navigation paths in the land). Agricultural system 108 also allows the operator to engage a learning system which automatically learns the turn pattern and land size. Agricultural system 108 then automatically determines the next navigation path through the field by analyzing coverage data (such as to ensure that the next path is not already harvested and that the unloading auger on the harvester is over already-harvested area) and to automatically generate turns until the specified or learned land size has been completely worked. At the completion of a land, agricultural system 108 can also automatically identify the next pass for starting the next land. Agricultural system 108 allows the operator to switch patterns at any time to continue a previous pattern, upon enabling the automatic turn system.

For instance, FIG. 1 shows that, upon completion of land 110, harvester 102 will continue along a path 134 through the already-harvested end rows to a different land in field 100 beginning at path 20. Harvester 104 continues along path 136 to begin another land along path 23 and harvester 106 continues along a path 138, through the already-harvested end rows, to begin another land with path 26.

Figure 2:
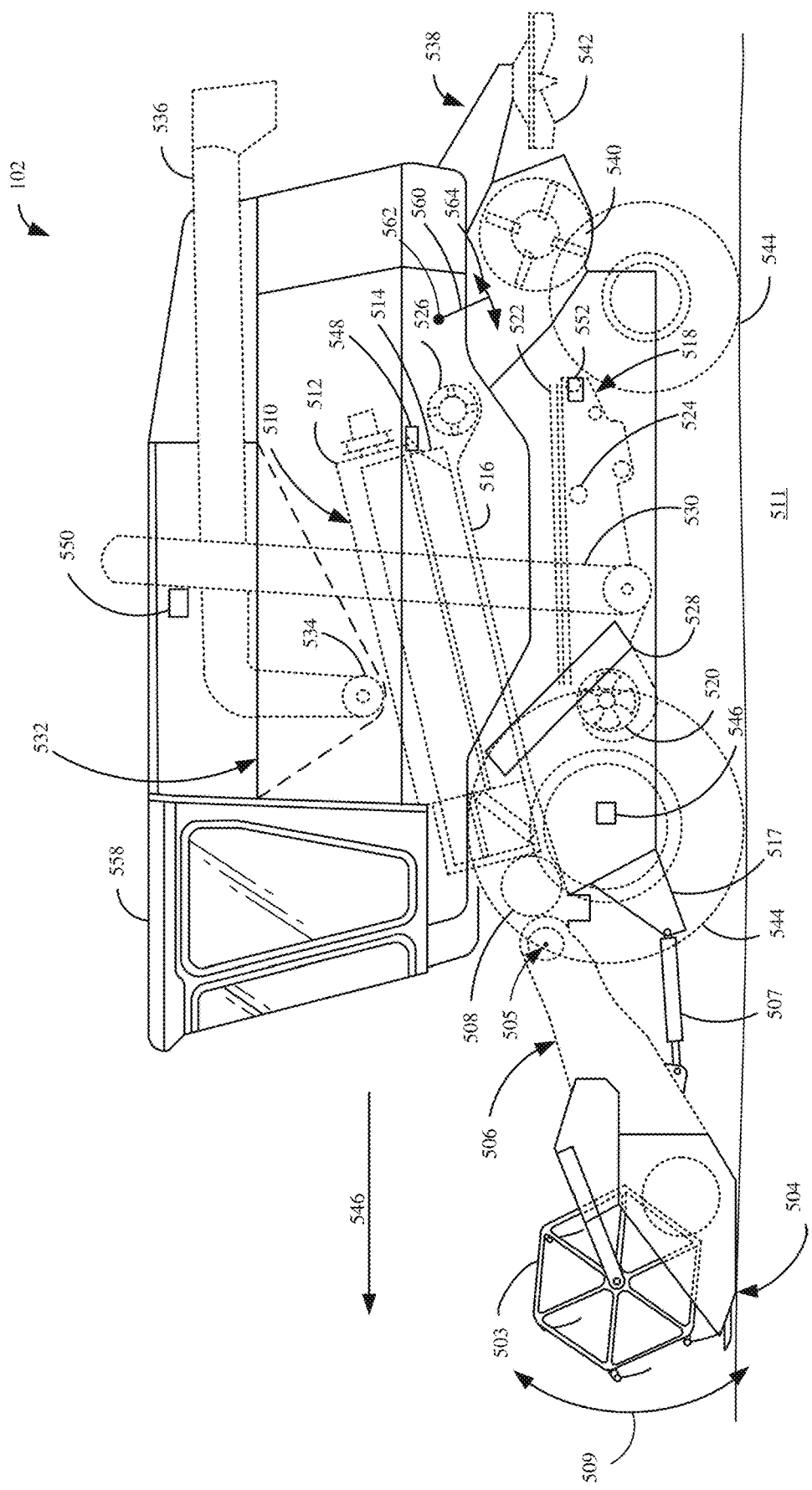
FIG. 2 is a partial pictorial, partial schematic view of a one example of a harvester.

FIG. 2 is a partial pictorial, partial schematic, illustration of a self-propelled agricultural harvesting machine 102, in an example where machine 102 is a combine harvester (or combine). It can be seen in FIG. 2 that combine 102 illustratively includes an operator compartment 558, which can have a variety of different operator interface mechanisms, for controlling combine 102. Combine 102 can include a set of front end equipment that can include header 503, and a cutter generally indicated at 504. It can also include a feeder house 506, a feed accelerator 508, and a thresher generally indicated at 510. Header 503 is pivotally coupled to a frame 517 of combine 102 along pivot axis 505. One or more actuators 507 drive movement of header 503 about axis 505 in the direction generally indicated by arrow 509. Thus, the vertical position of header 503 above ground 511 over which it is traveling can be controlled by actuating actuator 507. While not shown in FIG. 2, it may be that the tilt (or roll) angle of header 503 or portions of header 503 can be controlled by a separate actuator. Tilt, or roll, refers to the orientation of header 503 about the front-to-back longitudinal axis of combine 102.

Thresher 510 illustratively includes a threshing rotor 512 and a set of concaves 514. Further, combine 102 can include a separator 516 that includes a separator rotor. Combine 102 can include a cleaning subsystem (or cleaning shoe) 518 that, itself, can include a cleaning fan 520, chaffer 522 and sieve 524. The material handling subsystem in combine 102 can include (in addition to a feeder house 506 and feed accelerator 508) discharge beater 526, tailings elevator 528, clean grain elevator 530 (that moves clean grain into clean grain tank 532) as well as unloading auger 534 and spout 536. Combine 102 can further include a residue subsystem 538 that can include chopper 540 and spreader 542. Combine 102 can also have a propulsion subsystem that includes an engine that drives ground engaging wheels 544 or tracks, etc. It will be noted that combine 102 may also have more than one of any of the subsystems mentioned above (such as left and right cleaning shoes, separators, etc.).

In operation, and by way of overview, combine 102 illustratively moves through a field in the direction indicated by arrow 546. As it moves, header 503 engages the crop to be harvested and gathers it toward cutter 504. The operator illustratively sets a height setting for header 503 (and possibly a tilt or roll angle setting) and a control system (described below) controls actuator 507 (and possibly a tilt or roll actuator—not shown) to maintain header 503 at the set height above ground 511 (and at the desired roll angle). The control system responds to header error (e.g., the difference between the set height and measured height of header 503 above ground 511 and possibly roll angle error) with a responsiveness that is determined based on a set sensitivity level. If the sensitivity level is set high, the control system responds to, smaller header position errors, and attempts to reduce them more quickly than if the sensitivity is set lower.

After the crop is cut by cutter 504, it is moved through a conveyor in feeder house 506 toward feed accelerator 508, which accelerates the crop into thresher 510. The crop is threshed by rotor 512 rotating the crop against concaves 514. The threshed crop is moved by a separator rotor in separator 516 where some of the residue is moved by discharge beater 526 toward the residue subsystem 538. It can be chopped by residue chopper 540 and spread on the field by spreader 542. In other configurations, the residue is simply chopped and dropped in a windrow, instead of being chopped and spread.

Grain falls to cleaning shoe (or cleaning subsystem) 518. Chaffer 522 separates some of the larger material from the grain, and sieve 524 separates some of the finer material from the clean grain. Clean grain falls to an auger in clean grain elevator 530, which moves the clean grain upward and deposits it in clean grain tank 532. Residue can be removed from the cleaning shoe 518 by airflow generated by cleaning fan 520. Cleaning fan 520 directs air along an airflow path upwardly through the sieves and chaffers and the airflow carries residue can also be rearwardly in combine 102 toward the residue handling subsystem 538.

Tailings can be moved by tailings elevator 528 back to thresher 510 where they can be re-threshed. Alternatively, the tailings can also be passed to a separate re-threshing mechanism (also using a tailings elevator or another transport mechanism) where they can be re-threshed as well.

FIG. 2 also shows that, in one example, combine 102 can include ground speed sensor 547, one or more separator loss sensors 548, a clean grain camera 550, and one or more cleaning shoe loss sensors 552. Ground speed sensor 546 illustratively senses the travel speed of combine 102 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 552 illustratively provide an output signal indicative of the quantity of grain loss by both the right and left sides of the cleaning shoe 518. In one example, sensors 552 are impact sensors which count grain strikes per unit of time (or per unit of distance traveled) to provide an indication of the cleaning shoe grain loss. The impact sensors for the right and left sides of the cleaning shoe can provide individual signals, or a combined or aggregated signal. It will be noted that sensors 552 can comprise only a single sensor as well, instead of separate sensors for each shoe.

Separator loss sensor 548 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 548 may also comprise only a single sensor, instead of separate left and right sensors.

It will also be appreciated that sensor and measurement mechanisms (in addition to the sensors already described) can include other sensors on combine 102 as well. For instance, the sensors and mechanisms can include a header height sensor that senses a height of header 503 above ground 511. The sensors and mechanisms can include stability sensors that sense oscillation or bouncing motion (and amplitude) of combine 102. The sensors and mechanisms can include a residue setting sensor that is configured to sense whether machine 102 is configured to chop the residue, drop a windrow, etc. The sensors and mechanisms can include cleaning shoe fan speed sensors that can be configured proximate fan 520 to sense the speed of the fan. The sensors and mechanisms can include a threshing clearance sensor that senses clearance between the rotor 512 and concaves 514. The sensors and mechanisms include a threshing rotor speed sensor that senses a rotor speed of rotor 512. The sensors and mechanisms can include a chaffer clearance sensor that senses the size of openings in chaffer 522. The sensors and mechanisms can include a sieve clearance sensor that senses the size of openings in sieve 524. The sensors and mechanisms can include a material other than grain (MOG) moisture sensor that can be configured to sense the moisture level of the material other than grain that is passing through combine 102. The sensors and mechanisms can include machine setting sensors that are configured to sense the various configurable settings on combine 102. The sensors and mechanisms can also include a machine orientation sensor that can be any of a wide variety of different types of sensors that sense the orientation of combine 102. Crop property sensors can sense a variety of different types of crop properties, such as crop type, crop size (e.g., stalk width), crop moisture, and other crop properties. The crop property sensors can also be configured to sense characteristics of the crop as they are being processed by combine 102. For instance, the crop property sensors can sense grain feed rate (e.g., mass flow rate), as it travels through clean grain elevator 530, or provide other output signals indicative of other sensed variables. Environment sensors can sense soil moisture, soil compaction, weather (which may be sensed or downloaded), temperature, standing water, and other properties of the soil, crop, machine or environment. Some additional examples of the types of sensors that can be used are described below.

Figure 3:
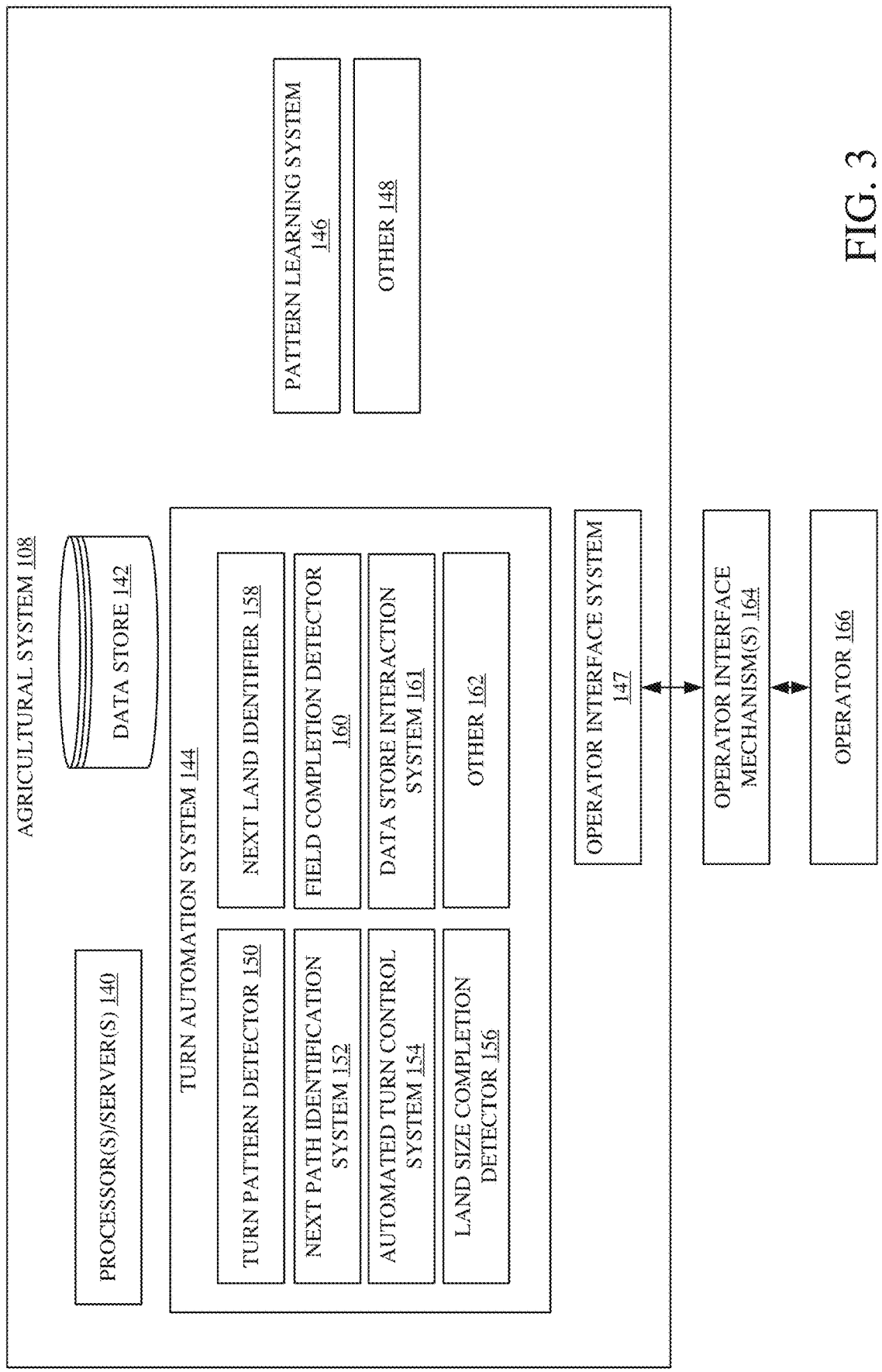
FIG. 3 is a block diagram of one example of an agricultural system.

FIG. 3 is a block diagram showing one example of agricultural system 108, in more detail. It will be appreciated, as discussed above, that agricultural system 108 can be entirely disposed on an individual harvester. Agricultural harvester system 108 can be partially deployed on each of the individual harvesters 102, 104, and 106 or system 108 can be partially deployed in the cloud, or it can all be deployed in the cloud. The agricultural system 108 can be distributed in other ways as well.

In the example shown in FIG. 3, agricultural system 108 includes one or more processors or servers 140, data store 142, turn automation system 144, pattern learning system 146, operator interface system 147, and other items 148. Turn automation system 144 illustratively includes turn pattern detector 150, next path identification system 152, automated turn control system 154, land size completion detector 156, next land identifier 158, field completion detector 160, data store interaction system 161, and other items 162.

Operator interface system 147 can generate an operator interface on one or more operator interface mechanisms 164 for interaction by one of the operators 166 of one of the agricultural harvesters 102-106. Operator 166 can thus interact with operator interface mechanisms 164 to control and manipulate agricultural system 108. In addition, operator 166 can interact with operator interface mechanisms 164 to control and manipulate the harvester which operator 166 is controlling. Therefore, operator interface mechanism 164 can be joysticks, a steering wheel, peddles, levers, buttons, switches, an interactive interface display that includes operator input mechanisms, such as icons, links, or other actuatable mechanisms. The operator input mechanisms can include a speech recognition system with microphone and speakers, or other audio, visual, or haptic interface mechanisms.

Before describing the overall operation of agricultural system 108, a description of some of items in agricultural system 108, and their operation, will first be provided. Turn automation system 144 detects a turn pattern and identifies a next navigation path to be completed in the turn pattern after the harvester completes the path that the harvester is currently operating on. Turn automation system 144 then generates output signals to automatically control the harvester through that turn to enter the next path. The next path is identified by analyzing which part of the fields have already been harvested so that the output auger of the harvester may remain over the already-harvested portion of the field so that a grain cart can travel adjacent the harvester to perform unloading, during operation of the harvester, without driving over any crops. Turn automation system 144 can also identify the next land that the harvester should proceed to.

Turn pattern detector 150 can generate an interactive operator interface that allows an operator to enter a turn pattern. Turn pattern detector 150 can also receive an input from pattern learning system 146 which learns the turn pattern without the turn pattern being specified by the operator. Based on the identified turn pattern, next path identification system 152 identifies the next path that the harvester will be traveling over, through the field. Automated turn control system 154 can generate outputs to control the harvester, automatically, through the identified turn. Further, when turn pattern detector 150 is disabled, automated turn control system 154 can navigate the harvester through a U-turn pattern in which the harvester makes alternating turns to work the field from one end to the other.

Land size completion detector 156 detects whether the current land that the harvester is operating on will be completed after the present pass. If not, next path identification system 152 then identifies the next pass through the field. To determine whether the land is completed, land size completion detector 156 can detect the number of paths that have been skipped in a spiral in pattern to determine the number of paths that are left to harvest. Land size completion detector 156 can identify the number of paths skipped in a spiral out pattern, and compare that to the land size, to determine whether the land size has been completed.

Once land size completion detector 156 detects that the land will be completed after the current pass, next land identifier 158 identifies a next land that the harvester should proceed to, within the field. Field completion detector 160 can detect when the field is completed so that a next land need not be harvested.

Next land identifier 158 can identify the next land by analyzing a map of the field as well as by communicating with any other harvesters in the field to determine what portions of the field have already been harvested. The next land for the current harvester can be identified by calculating the next land for each of the harvesters that will result in the lowest time to completion of the field, the best fuel efficiency, or based on other criteria. Field completion detector 160 can determine whether the field is complete by analyzing a map of the field and information from any harvesters operating in the field to determine whether all rows have been harvested.

Pattern learning system 146 can be enabled by operator 166 so that pattern learning system 146 automatically learns the pattern that the operator is using by identifying the directions of the turns being executed by the harvester and the number of row skips between turns. Pattern learning system 146 can learn the pattern in other ways as well. By automatically it is meant, in one example, that the system completes the operation without further involvement, except perhaps to initiate or authenticate the operation.

Figure 4:
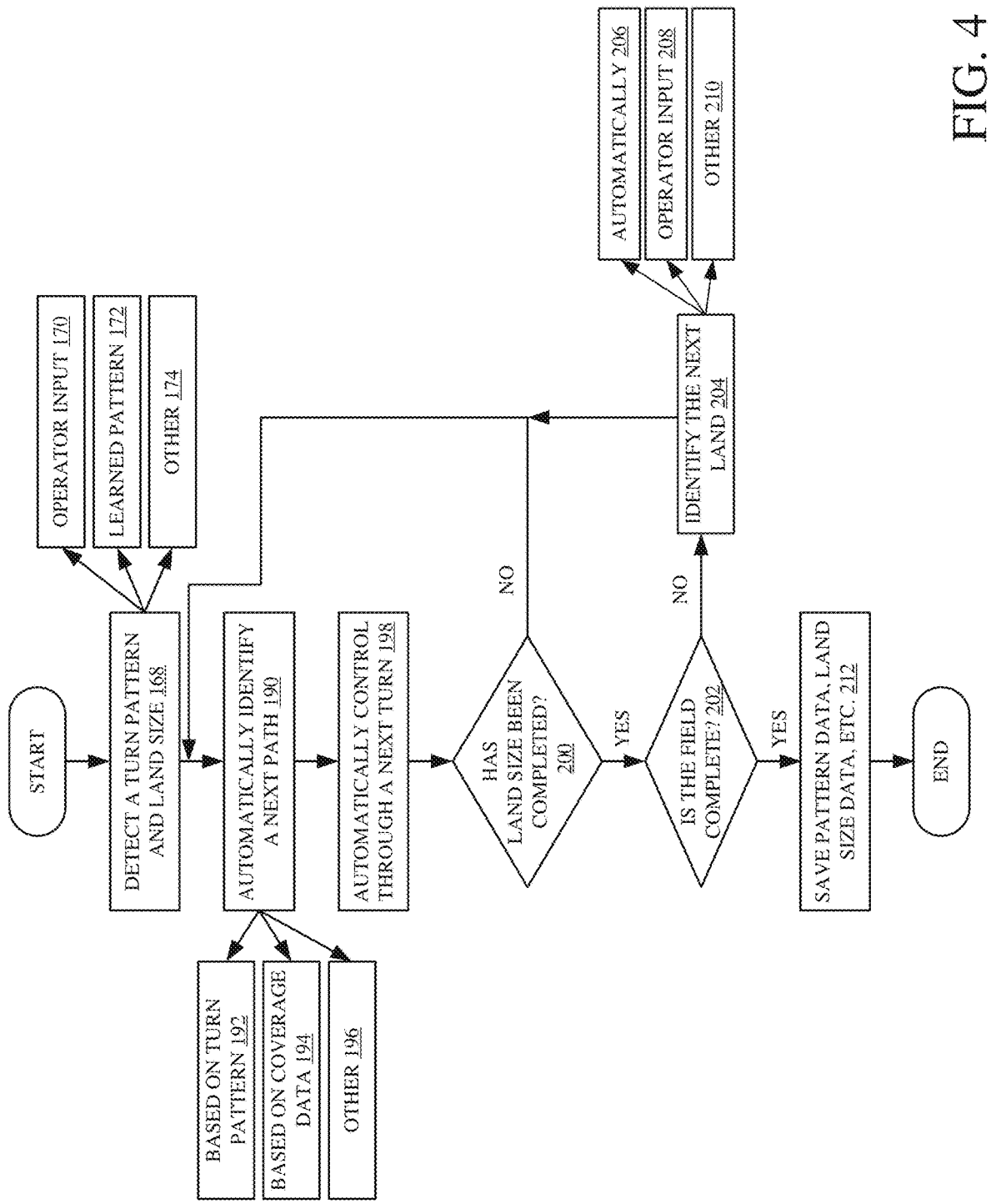
FIG. 4 is a flow diagram illustrating one example of the operation of an agricultural system.

FIG. 4 is a flow diagram illustrating one example of the operation of agricultural system 108 in identifying turns that the harvester should take and controlling the harvester to navigate those turns, in harvesting the field. Turn pattern detector 150 first detects a turn pattern and a land size in which the harvester is performing a harvesting operation. It will be assumed for the sake of the present description that the harvester is harvester 102. Detecting a turn pattern and land size is indicated by block 168 in the flow diagram of FIG. 4. The turn pattern detector 150 can control operator interface system 147 to generate an operator interface 164 that allows operator 166 to select a pattern. Detecting a pattern based upon an operator input is indicated by block 170 in the flow diagram of FIG. 4. In another example, the operator can enable pattern learning system 146 to learn the pattern, as indicated by block 172. The turn pattern and land size can be detected in other ways as well, as indicated by block 174.

Figure 7A:
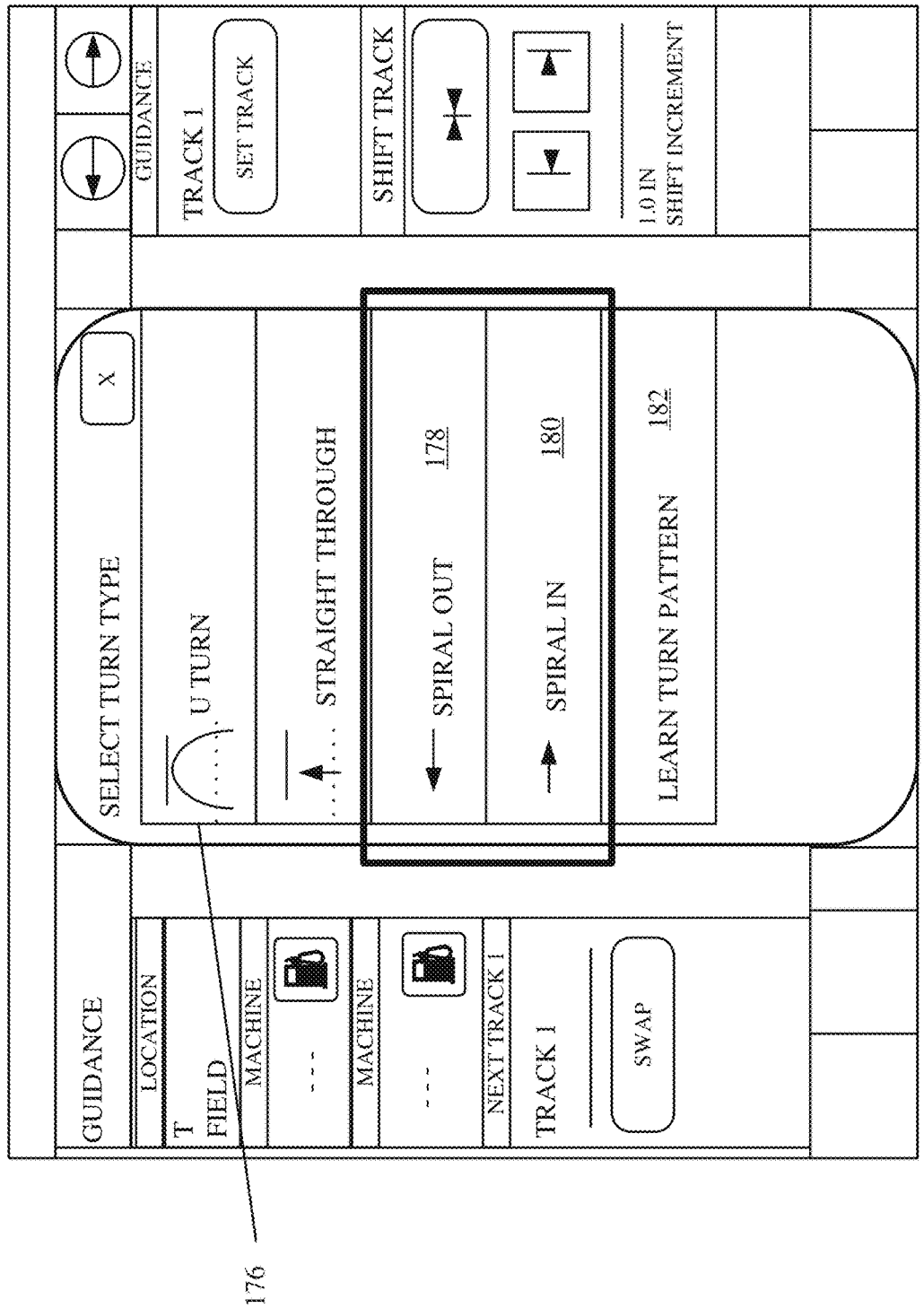
FIGS. 7A, 7B, 7C, 7D, 7E, 7F, 7G, 7H, 7I, 7J, 7K, 7L, 7M, 7N, and 7O show examples of user interface displays that can be generated on an agricultural harvester.

FIG. 7A shows one example of a portion of a user interface display 176 that can be generated so that operator 166 can select the pattern to be used. The interface 176 includes spiral out actuator 178, spiral in actuator 180, and learn turn pattern actuator 182. When a turn pattern actuator 178 or 180 is actuated, the turn pattern detector 150 loads a default turn direction (e.g., turn left or turn right) and a default land size for that pattern into memory so that next path identification system 152 can identify the next path and so that automated turn control system 154 can control the harvester to move through that turn. Table 1 shows examples of default turn direction, and a number of skips that will be used in performing the turn pattern. When conducting a spiral out pattern, for instance, the harvester does not skip any unharvested paths but instead proceeds to the next unharvested path and harvests it. When conducting a spiral in pattern, the number of paths will include the land size (in terms of the number of paths) less one. The default patterns and land sizes can be stored from the prior year in the same field, from the last time this machine or operator operated, or in other ways.

TABLE 1

| TURN PATTERN | DEFAULT TURN DIRECTION | DEFAULT # OF SKIPS |
| --- | --- | --- |
| SPRIAL OUT | LEFT | 0 |
| SPIRAL IN | RIGHT | LAND SIZE −1 |

Figure 7B:
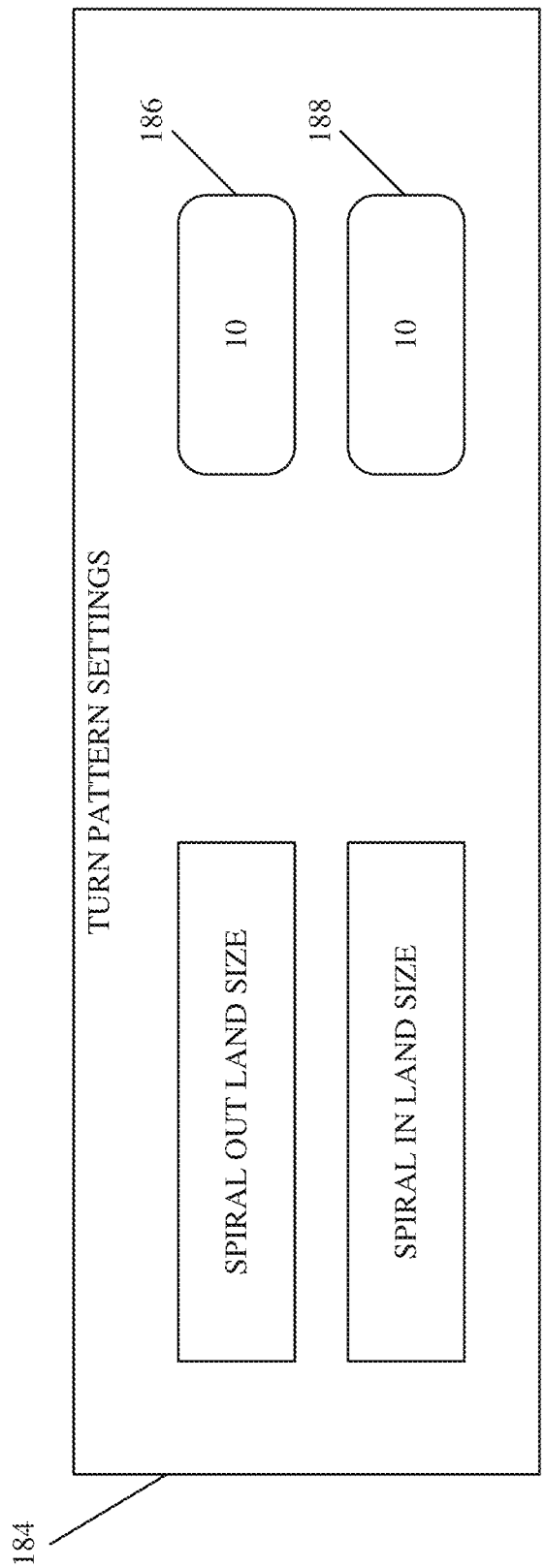

FIG. 7B shows an example of an interface 184 that can be generated by turn pattern detector 150 to allow the operator 166 to modify the land size. For instance, the land size is set to a default value of 10 paths for both the spiral out and spiral in pattern detectors. By actuating an actuator 186, operator 166 can change the number of paths through the field that define the land size for the spiral out pattern. By actuating actuator 188, the operator 166 can modify the number of paths used to define the land size for the spiral in land pattern.

Referring again to FIG. 7A, interface 176 also includes the learn turn pattern actuator 182 that can be actuated by operator 164 to enable pattern learning system 146 so that pattern learning system 146 automatically learns the turn pattern and land size by allowing the operator 166 to perform a desired number of turns and monitoring the direction of those turns and the number of paths that have been skipped. This is described in greater detail below.

Once the turn pattern has been detected by turn pattern detector 150, then next path identification system 152 automatically identifies a next harvesting path through the field that the harvester will take, as indicated by block 190 in the flow diagram of FIG. 4. Next path identification system 152 identifies the next path based upon the detected pattern and the turn direction for that pattern, as indicated by block 192. The next path can be identified based on an analysis of which portions of the field have already been harvested, as indicated by block 194. The next path can be identified in other ways as well, as indicated by block 196.

Automated turn control system 154 then generates output signals to automatically control the harvester 102 through the identified next turn, as indicated by block 198. Automated turn control system 154 can use a map of the field to identify a current location and a GPS receiver or other location sensor that identifies the current location of harvester 102 within the field, and the location of the next turn. The location of the next path is also identified so that automated turn control system 154 can navigate the harvester 102 through the turn, in the proper direction, cutting back into the field at the proper location to harvest the next path.

Land size completion detector 156 detects whether the land size has been completed, as indicated by block 200 in the flow diagram of FIG. 4. If the land size has not been completed, processing reverts to block 190 where next path identification system 152 identifies the next path through the field in harvesting the current land.

If, at block 200, land size completion detector 156 detects that the land has been completed, then field completion detector 160 detects whether the field is completed, as indicated by block 202. If not, next land identifier 158 identifies the next land, as indicated by block 204. The next land can be identified automatically, as indicated by block 206 or based on an operator input, as indicated by block 208, or in other ways, as indicated by block 210. Once the next land is identified at block 204, processing reverts to block 190 where the next path is identified so that the harvester can be automatically navigated to the next path.

Once field completion detector 160 detects that the field is complete, then turn automation system 144 saves the pattern data identifying the pattern and the geographic location where the pattern was executed, the land size data indicative of the land size, among other data. Saving the pattern data, land size data, etc., is indicated by block 212 in FIG. 4.

Figure 7C:
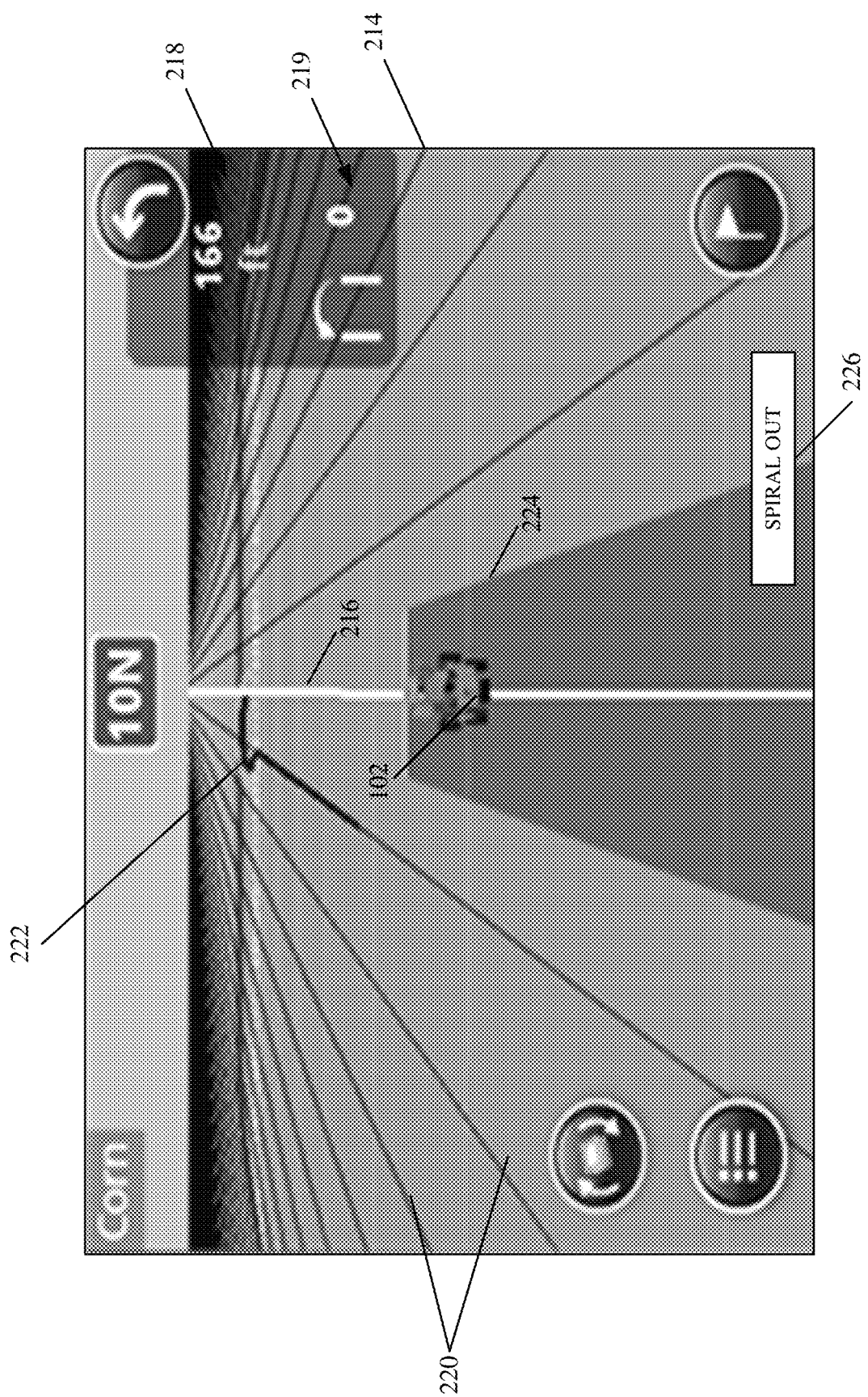

FIGS. 7C-7O show additional user interface displays that can be generated and provided over operator interface mechanisms 164 to operator 166. FIGS. 7C-7F show turn for a spiral out pattern. The spiral out pattern shown in FIGS. 7D-7F will continue until the harvester 102 is on its final guidance path and the number of skips reaches that number defined by the land size being harvested. FIG. 7C, for instance, shows a user interface display 214 that can be generated on a display device in the operator compartment of harvester 102, on a mobile device in the operator compartment of harvester 102, or on another device. Display 214 shows a rendering of harvester 102 navigating on a guidance path 216. A super imposed display element 218 shows the direction of the next turn and the number of guidance paths that will be skipped (in the case of FIG. 7C no guidance paths will be skipped) and the distance until the turn is commenced (in the example shown in FIG. 7C, the distance to the turn is 166 feet). The superimposed portion 218 also includes a skip identifier 219 that identifies the number of guidance paths that will be skipped in making the next turn. The number of skips indicator 219 will be incremented by one in executing a spiral out pattern, and decremented by one when conducting a spiral in pattern.

Display 214 also shows a plurality of guidance paths represented by lines 220, along with a representation of the next turn indicated by number 222. Display 214 also shows a shaded area 224 that represents already-harvested area in the field being worked. Display 214 also shows a pattern indicator 226 that identifies the current turn pattern. In the example shown in FIG. 7C, the turn pattern is a spiral out pattern.

Figure 7D:
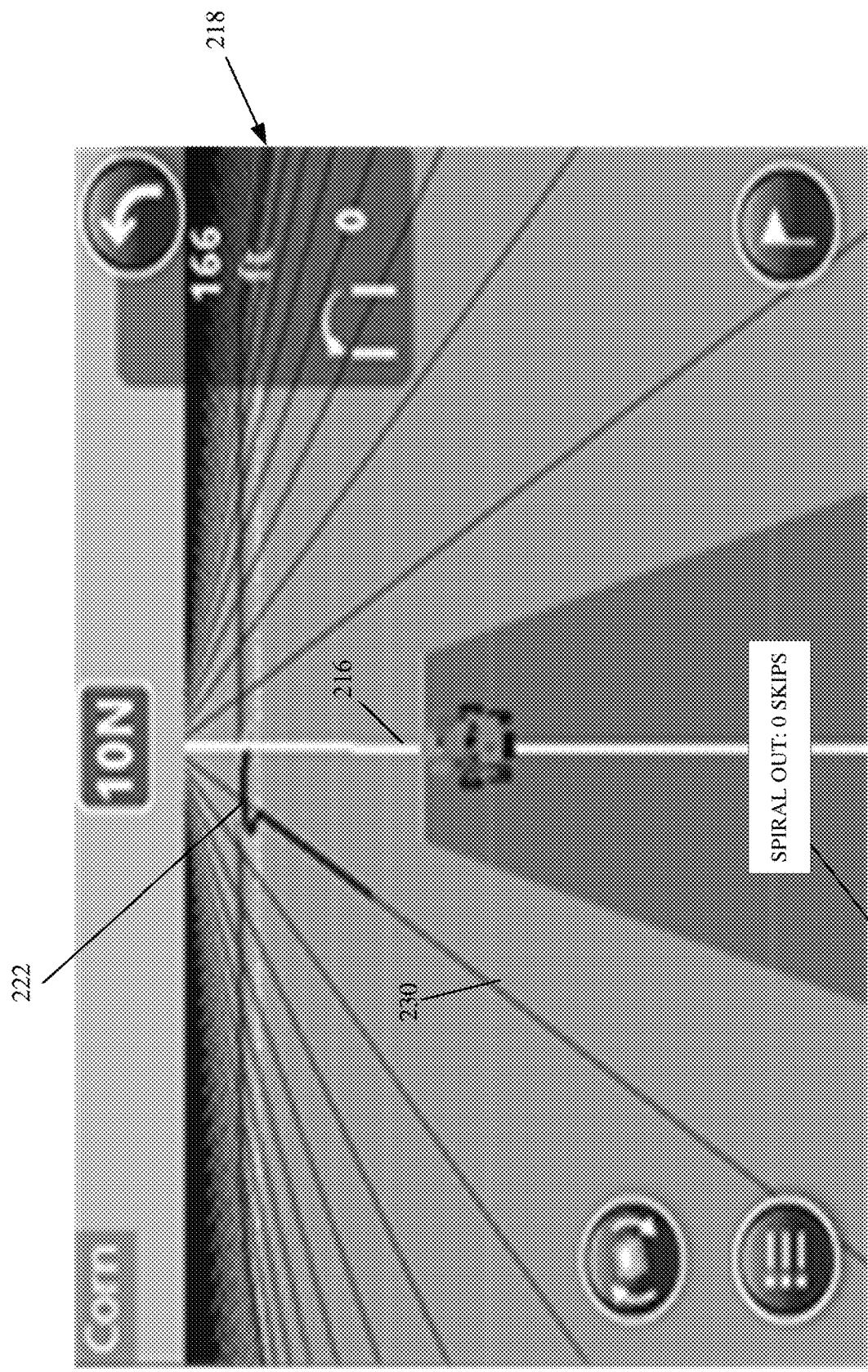

FIG. 7D is similar to FIG. 7C, and similar items are similarly numbered. However, in FIG. 7D the pattern display element 226 is replaced by pattern/skip display element 228 which not only shows the pattern being executed (in the example shown in FIG. 7D, a spiral out pattern) but also shows the number of skips of guidance paths that will be skipped in executing the next turn (in the example shown in FIG. 7D, zero guidance paths will be skipped).

Figure 7E:
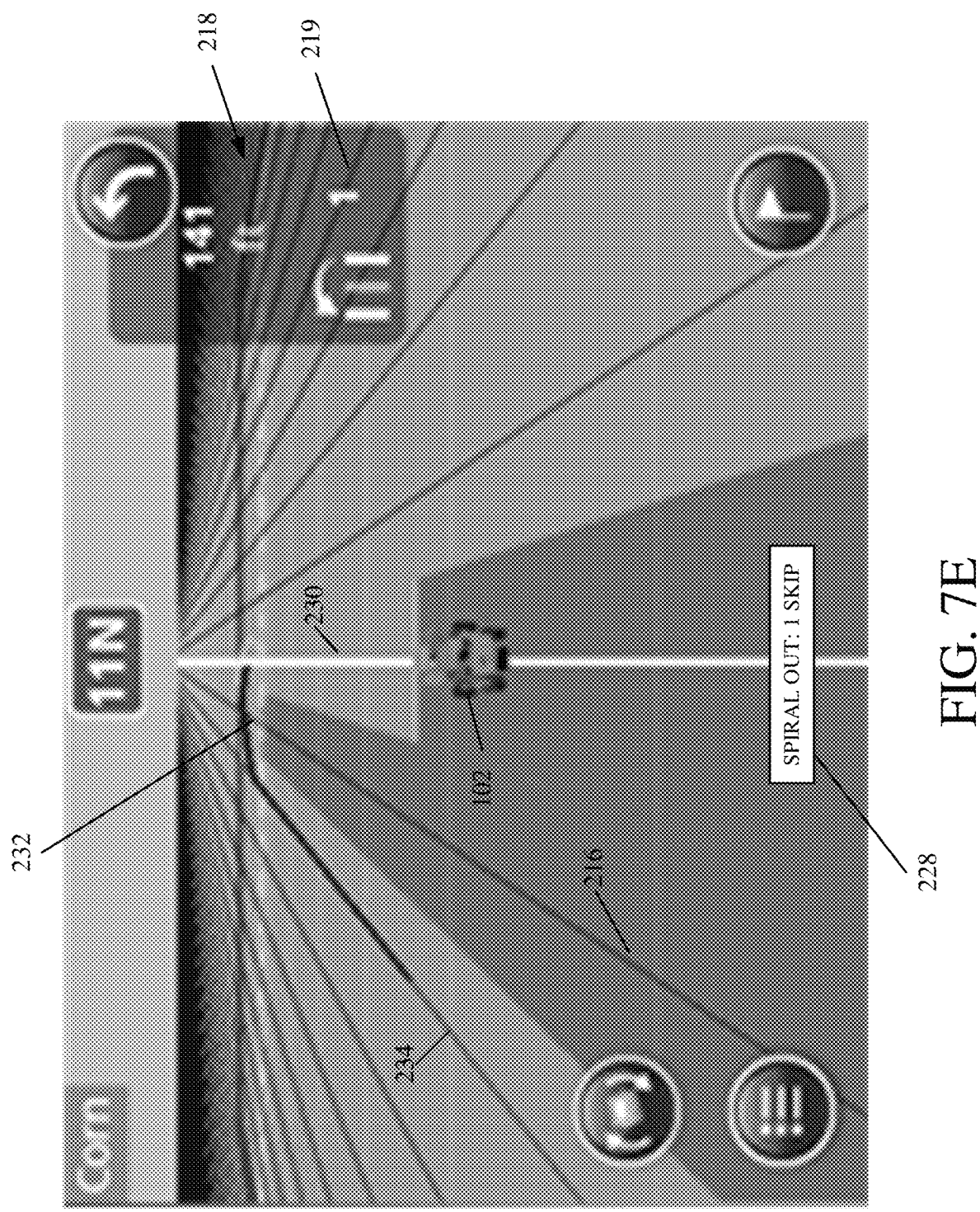

FIG. 7E is similar to FIG. 7D, and similar items are similarly numbered. However, FIG. 7E shows that harvester 102 is now harvesting along a different guidance path 230, instead of on guidance path 216. Therefore, in FIG. 7E, harvester 102 has already made the turn identified by turn identifier 222 shown in FIG. 7D. FIG. 7E shows that, in the next turn identified by turn identifier 232, one guidance path will be skipped (the guidance path 216 that has already been harvested by harvester 102). FIG. 7E shows that the next path to be harvested will be path 234 in the interface illustrated in FIG. 7E.

Figure 7F:
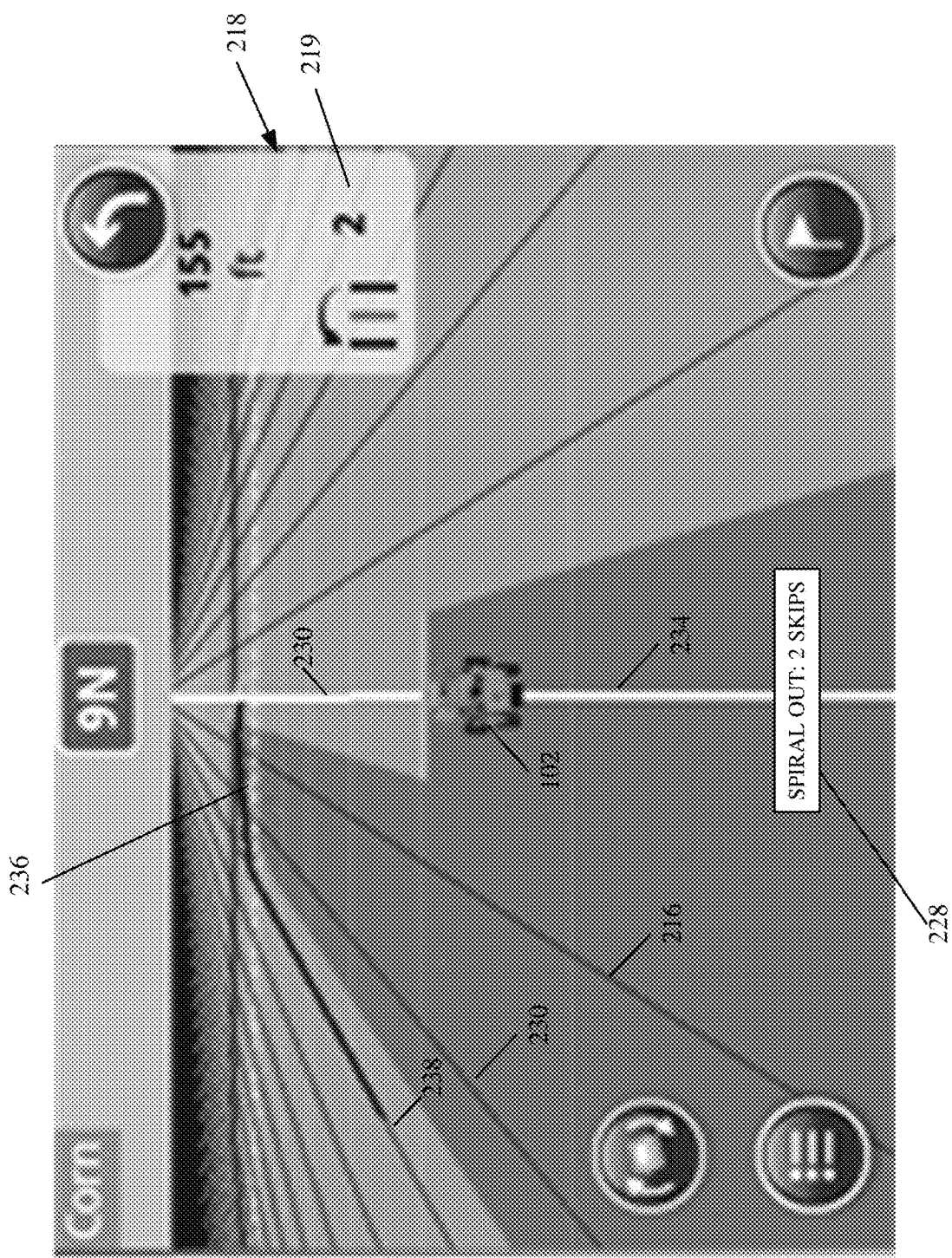

FIG. 7F is similar to FIG. 7E, and similar items are similarly numbered. However, FIG. 7E shows harvester 102 harvesting along guidance path 234, after it made the turn 232 shown in FIG. 7E. Thus, in FIG. 7F, pattern indicator 228 now shows that the pattern is still a spiral out pattern, but in conducting the next turn 236, harvester 102 will skip two guidance paths (guidance paths 216 and 230) which have already been harvested, and instead begin harvesting along guidance path 238.

Figure 7G:
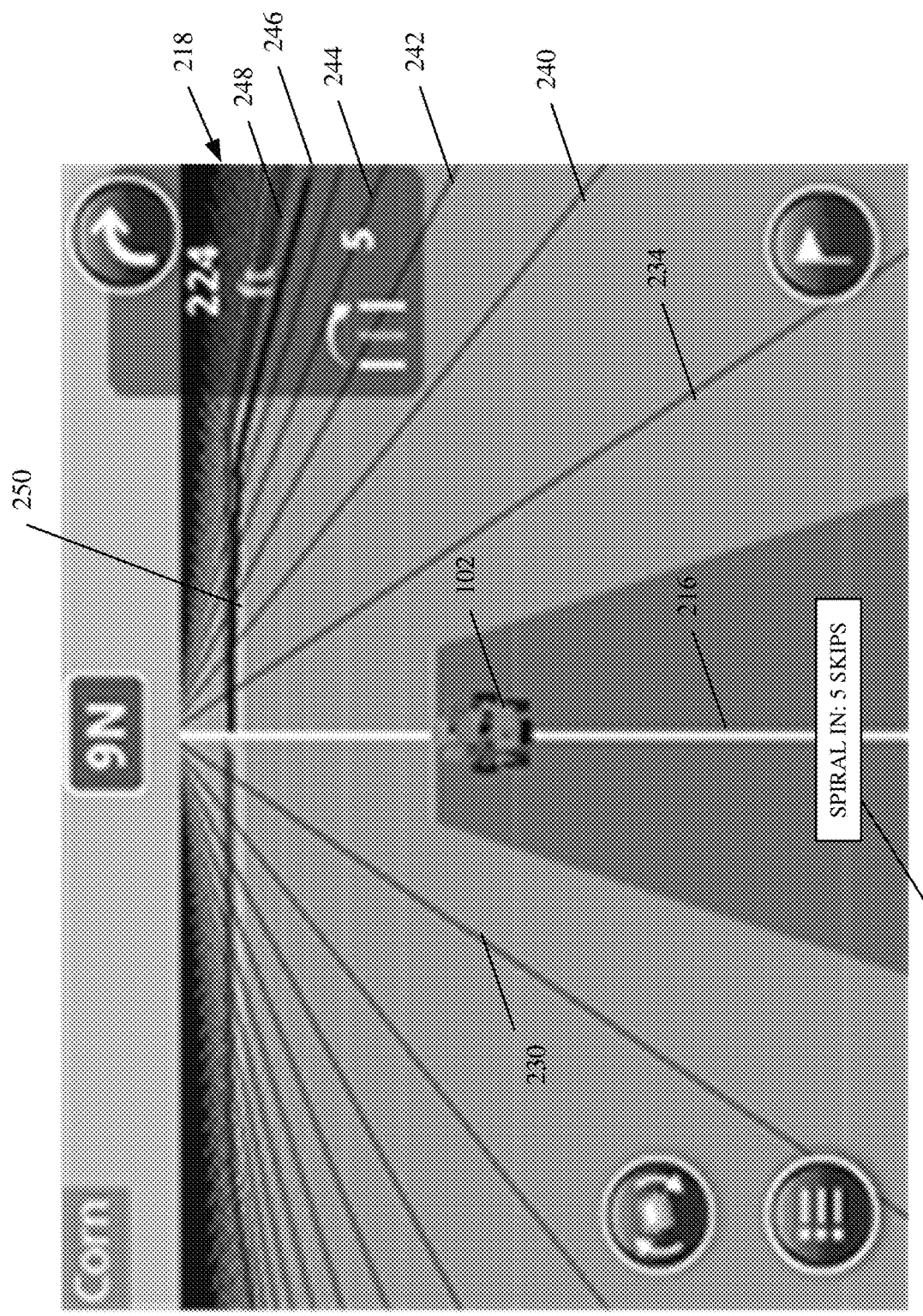
Figure 7H:
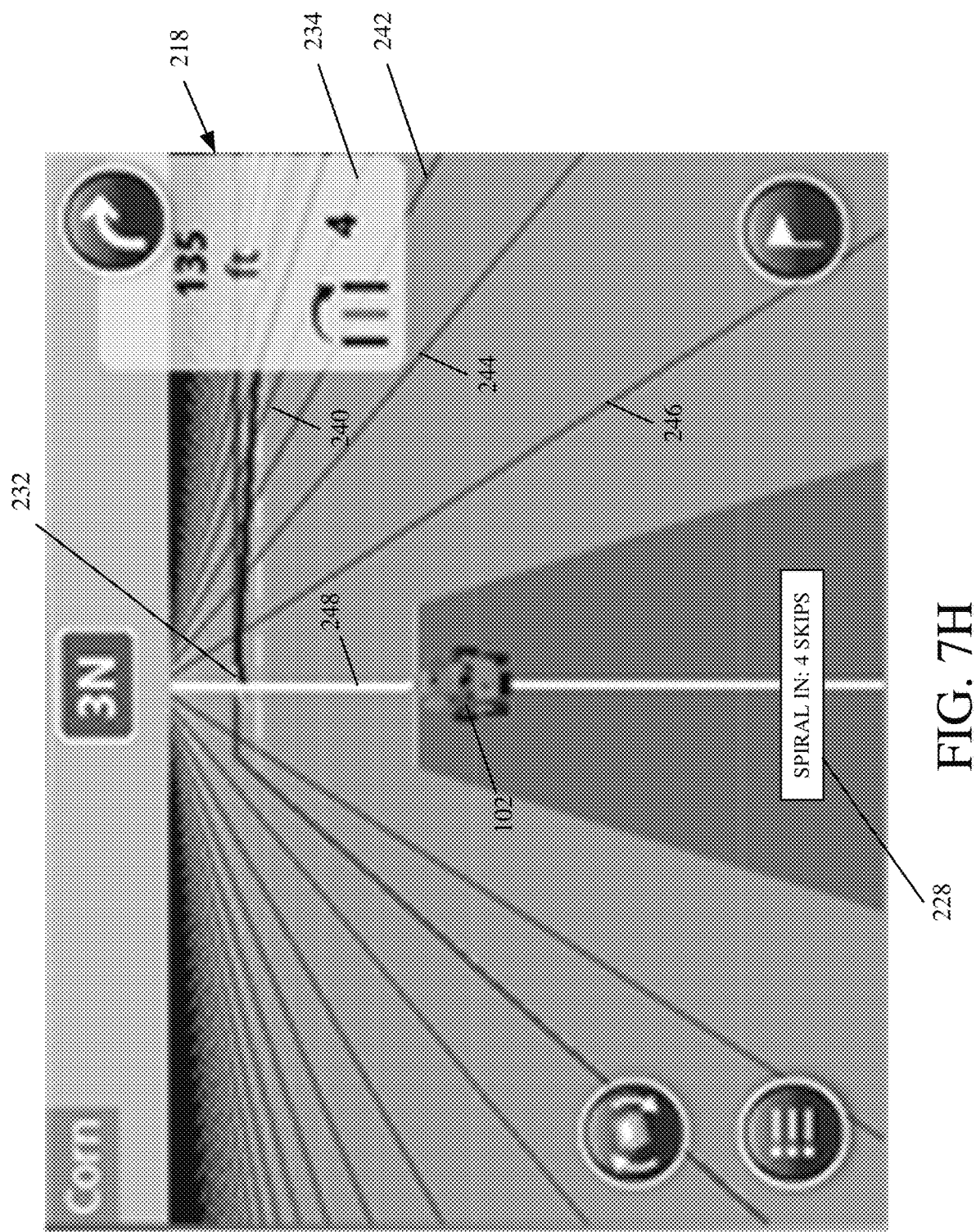
Figure 7I:
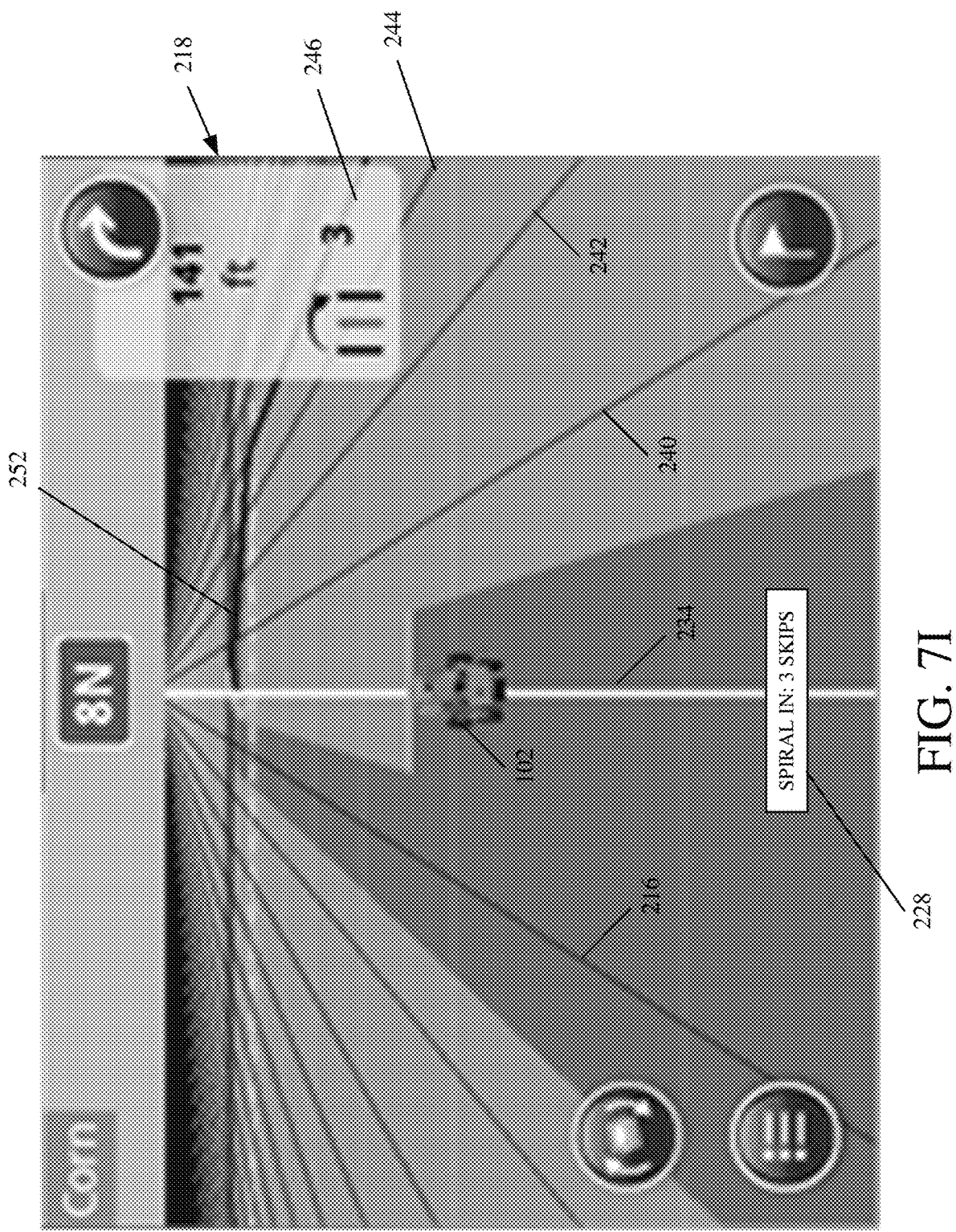

FIGS. 7G, 7H, and 7I are similar interfaces to those shown in FIGS. 7D, 7E, and 7F, except that the pattern being executed by harvester 102 is a spiral in pattern, instead of a spiral out pattern. Therefore, skip indicator 228 shows that the pattern is a spiral in pattern and, based on the land size, harvester 102 will skip five guidance paths, including guidance paths 234, 240, 242, 244, and 246 before beginning harvesting along its next path 248. Therefore, turn indicator 250 shows that harvester 102 will reach the end of guidance path 216, take a right turn, skip guidance paths 234, 240, 242, 244, and 246, before executing another right turn to begin harvesting along guidance path 248.

FIG. 7H is similar to FIG. 7G and similar items are similarly numbered. However, in FIG. 7H, harvester 102 has now executed turn 250 (shown in FIG. 7G) and is harvesting along guidance path 248. FIG. 7H also shows that the next turn 250 navigated by harvester 102 will cause harvester 102 to skip four guidance paths so that harvester 102 begins harvesting along guidance path 234 after executing turn 250.

FIG. 7I is similar to that shown in FIG. 7H, and similar items are similarly numbered. However, FIG. 7I now shows that when conducting the next turn 252, harvester 102 will skip three guidance paths (e.g., the guidance paths 240, 242, and 244) and begin harvesting along guidance path 246. The spiral in pattern is continued until the entire land is processed in which case the number of skips will be decremented to −1 (because harvester 102 will be on its final guidance path).

Figure 7J:
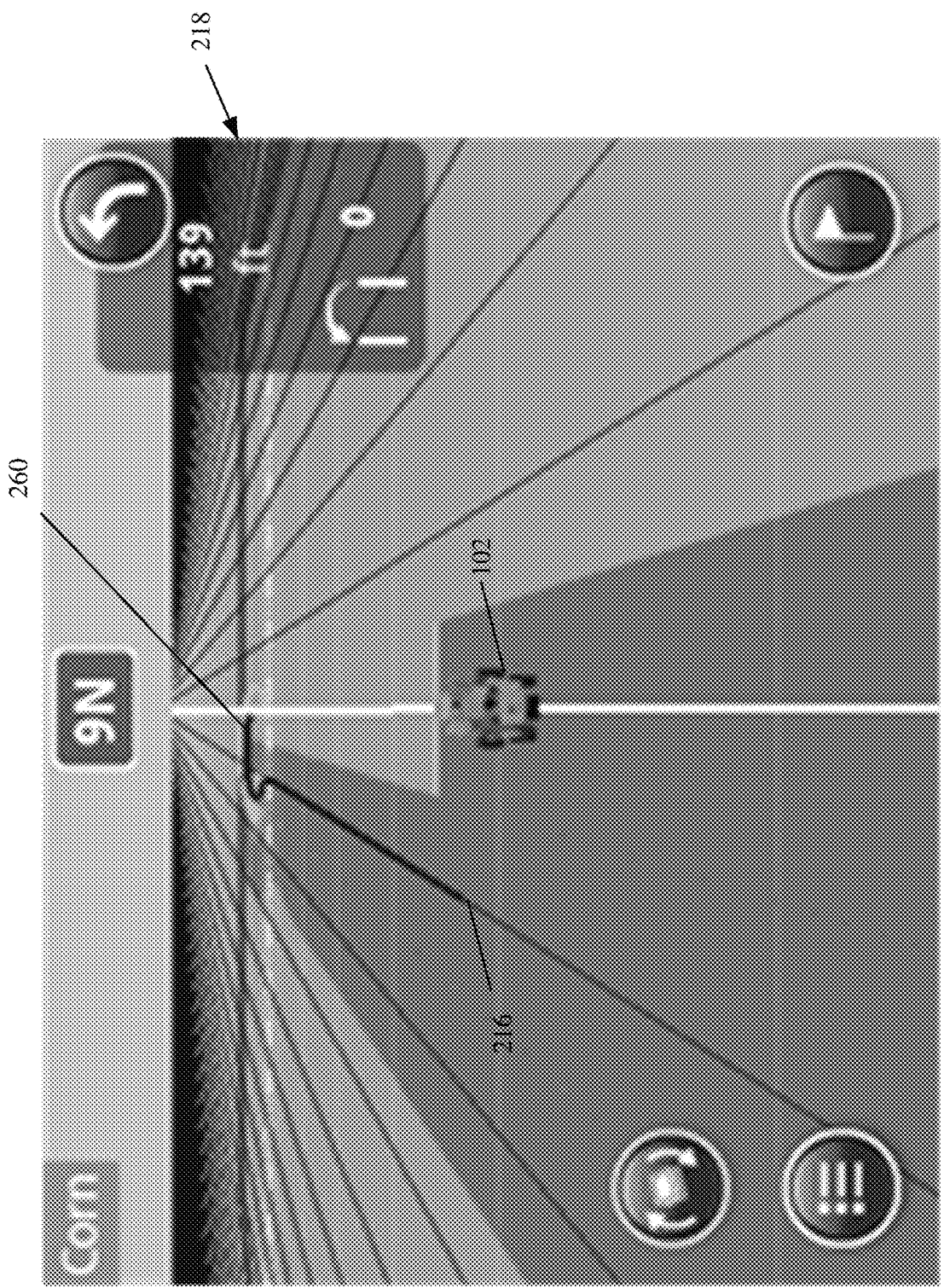
Figure 7K:
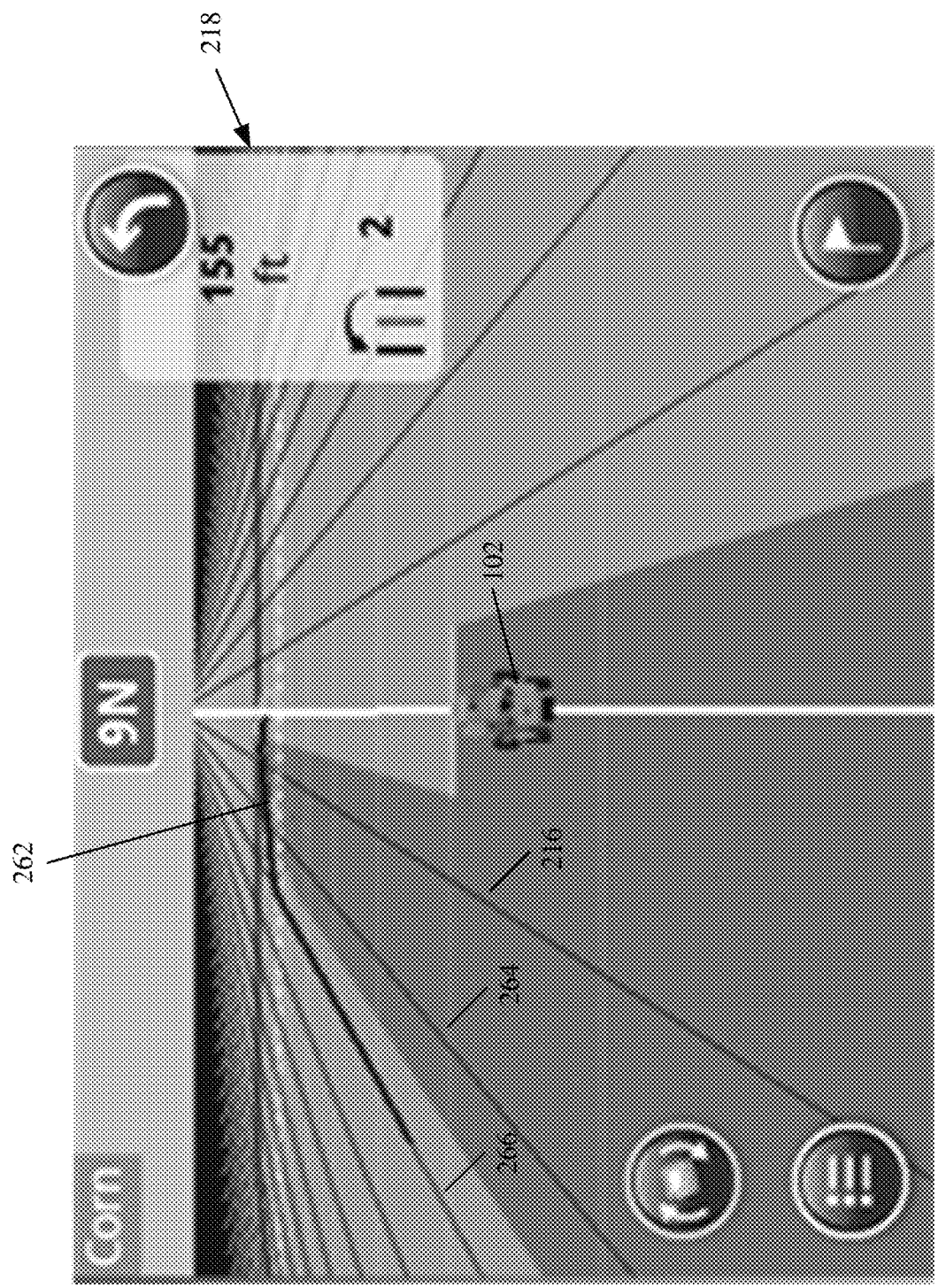

FIGS. 7J and 7K are user interfaces that illustrate that the operator can disable the pattern detector and re-enable it at any point. In FIG. 7J, the turn pattern detector 150 is disabled and automated turn control system 154 is controlling the harvester 102 to perform a U-turn pattern so that a turn 260 is identified. Turn 260 would put harvester 102 on guidance path 216, which has already been harvested. Therefore, when the operator 166 enables the pattern detector, the display switches to that shown in FIG. 7K in which turn automation system 144 analyzes the coverage in the field to identify the proper turn 262 with multiple skips so that harvester 102 is now harvesting on guidance path 266, which has not yet been harvested.

Figure 7L:
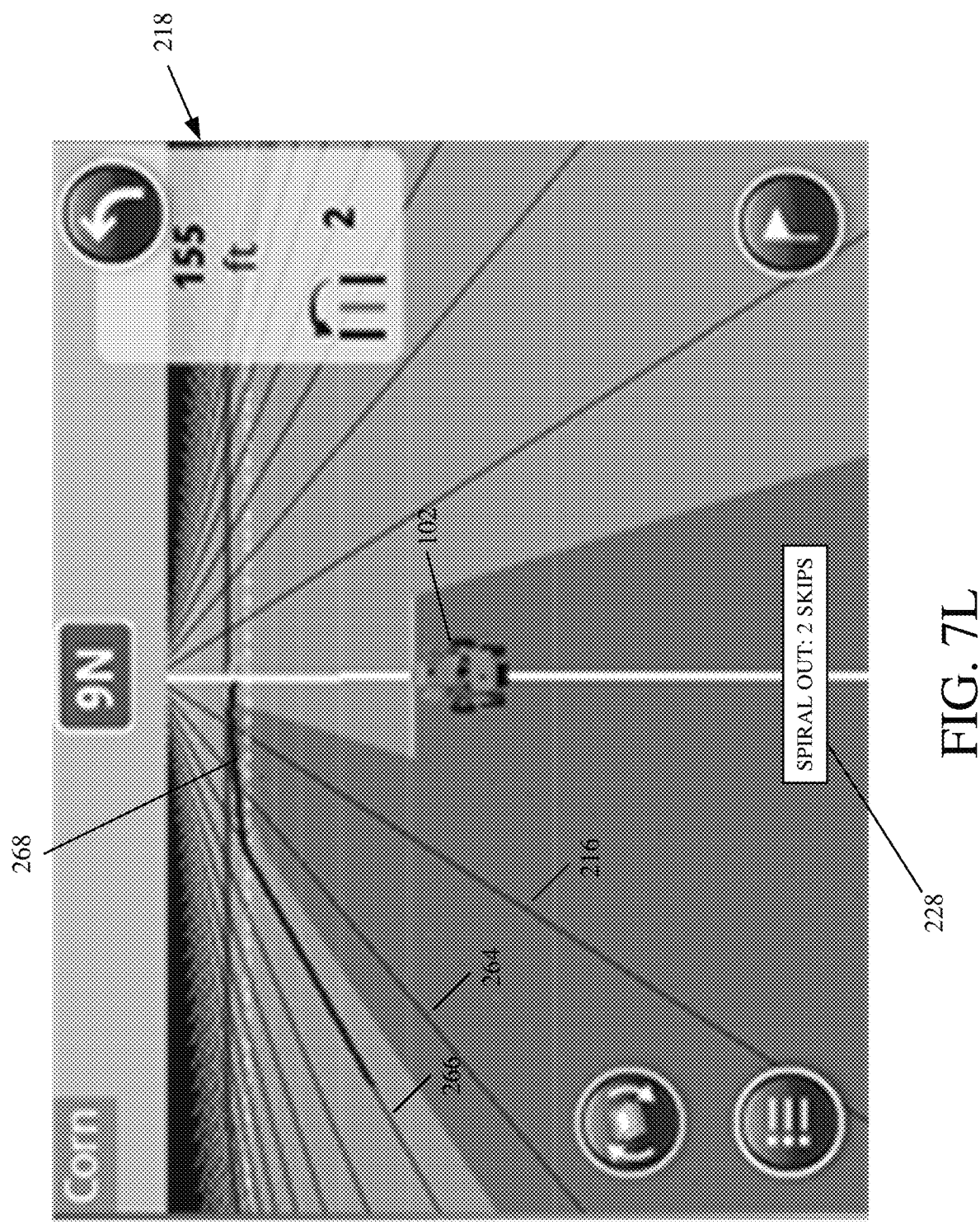
Figure 7M:
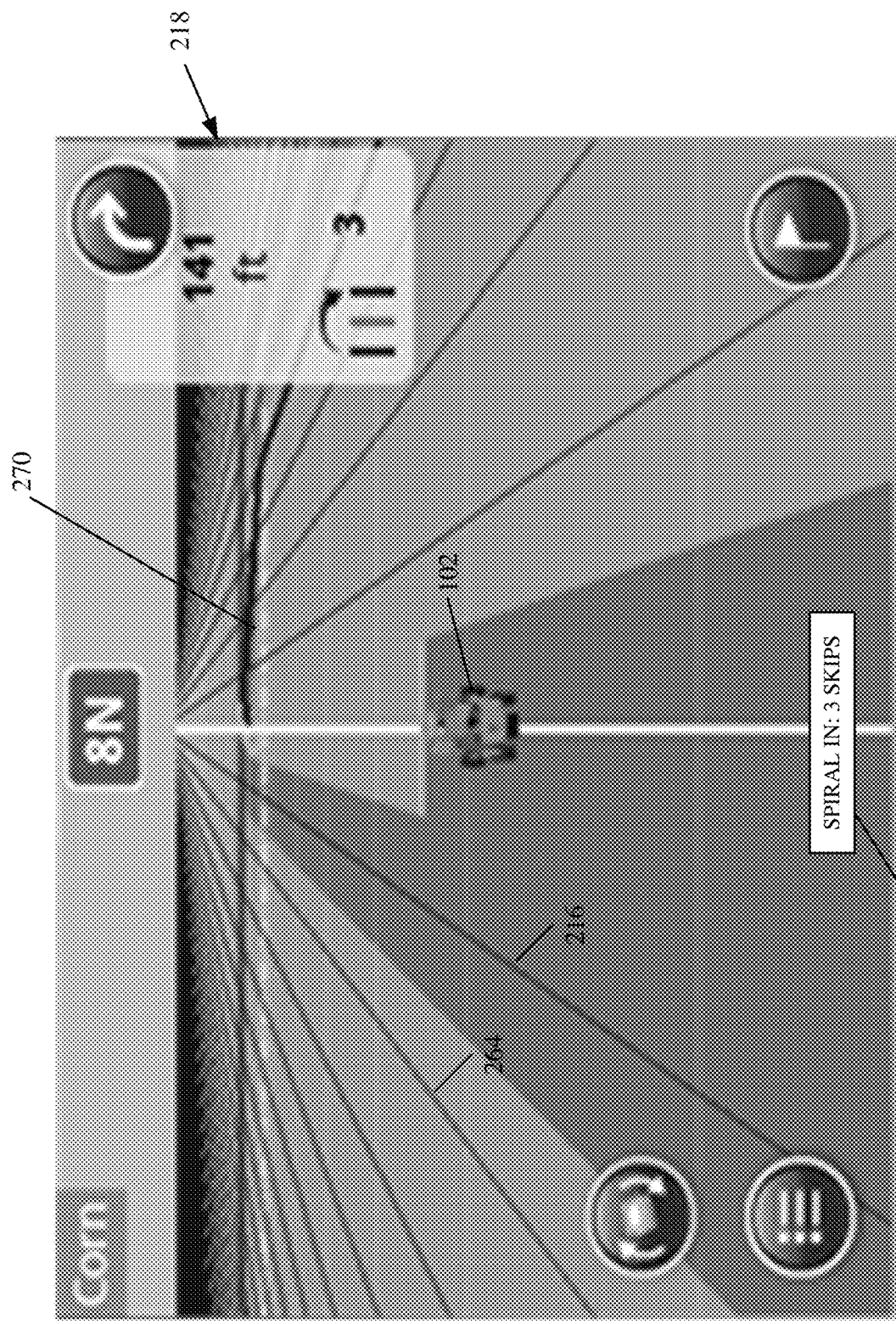
Figure 7N:
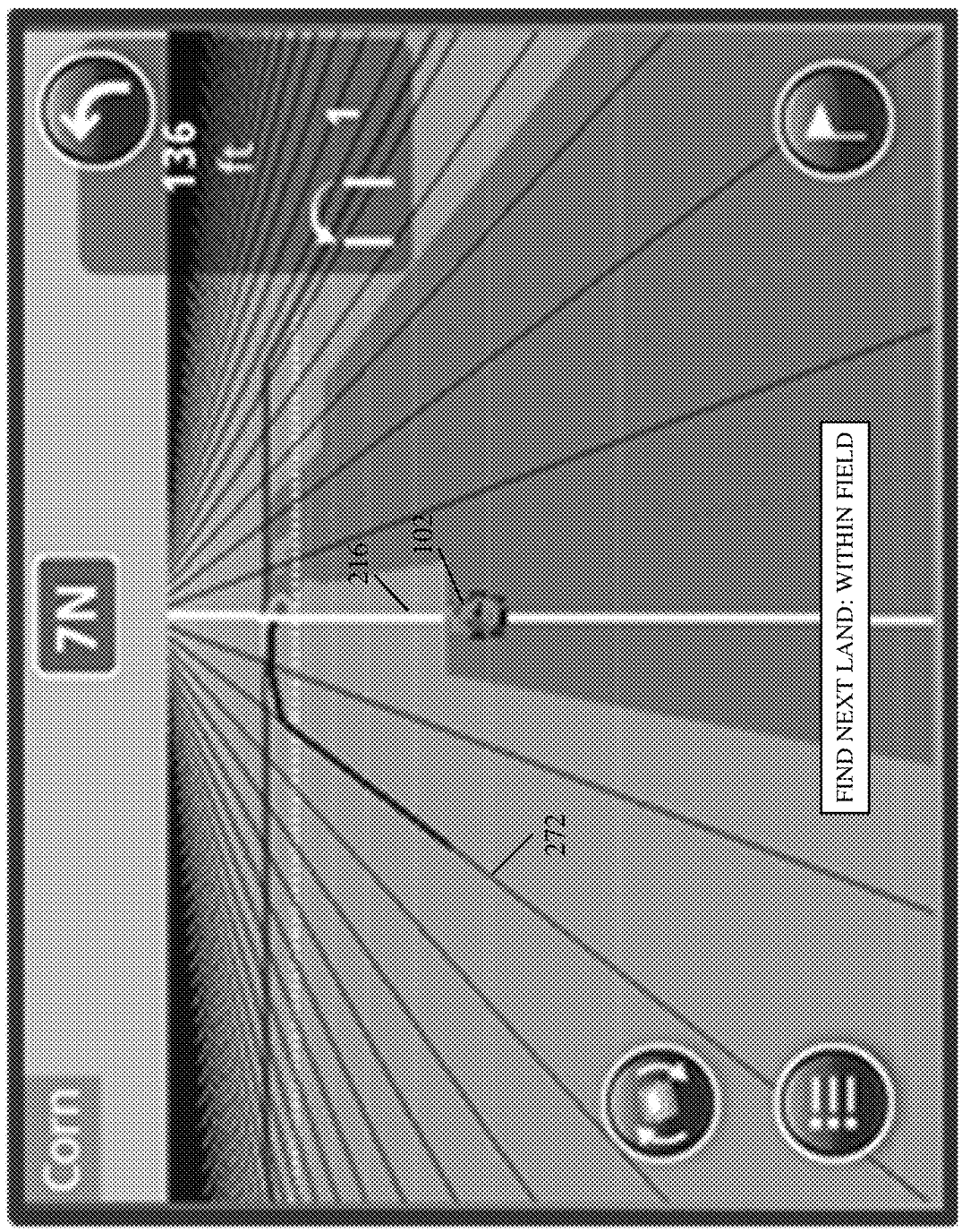

Also, in one example, operator 166 can switch the turn pattern at any point during operation of the machine. FIGS. 7L and 7M show user interfaces that can be generated illustrating how the operation of harvester 102 changes by switching the turn pattern. FIG. 7L shows that the turn pattern is a spiral out pattern so that the next turn that is identified is turn 268 which skips two guidance paths. However, FIG. 7M shows that the operator 166 has changed the turn pattern to a spiral in pattern. In that case, based upon the size of the land, the turn automation system 144 identifies a different turn 270 which includes three skips and indicates that the turn pattern is a spiral in pattern as opposed to a spiral out pattern.

Also, in another example, next land identifier 158 attempts to automatically identify a next land to be harvested when the number of skips exceeds the threshold for the current type of pattern. Next land identifier 158 identifies a closest collection of unworked guidance paths (in which no significant harvesting has been performed) within the field that matches the land size. In the example shown in FIG. 7N, harvester 102 is on its last pass for a spiral out pattern. The next land is to the left of harvester 102. Therefore, next land identifier 158 identifies the four passes to the left of guidance path 216 as being the next land. Next path identification system 152 identifies guidance path 272 as the next guidance path for harvester 102 to perform a spiral out pattern in order to harvest a land that has a size of four guidance paths.

Figure 7O:
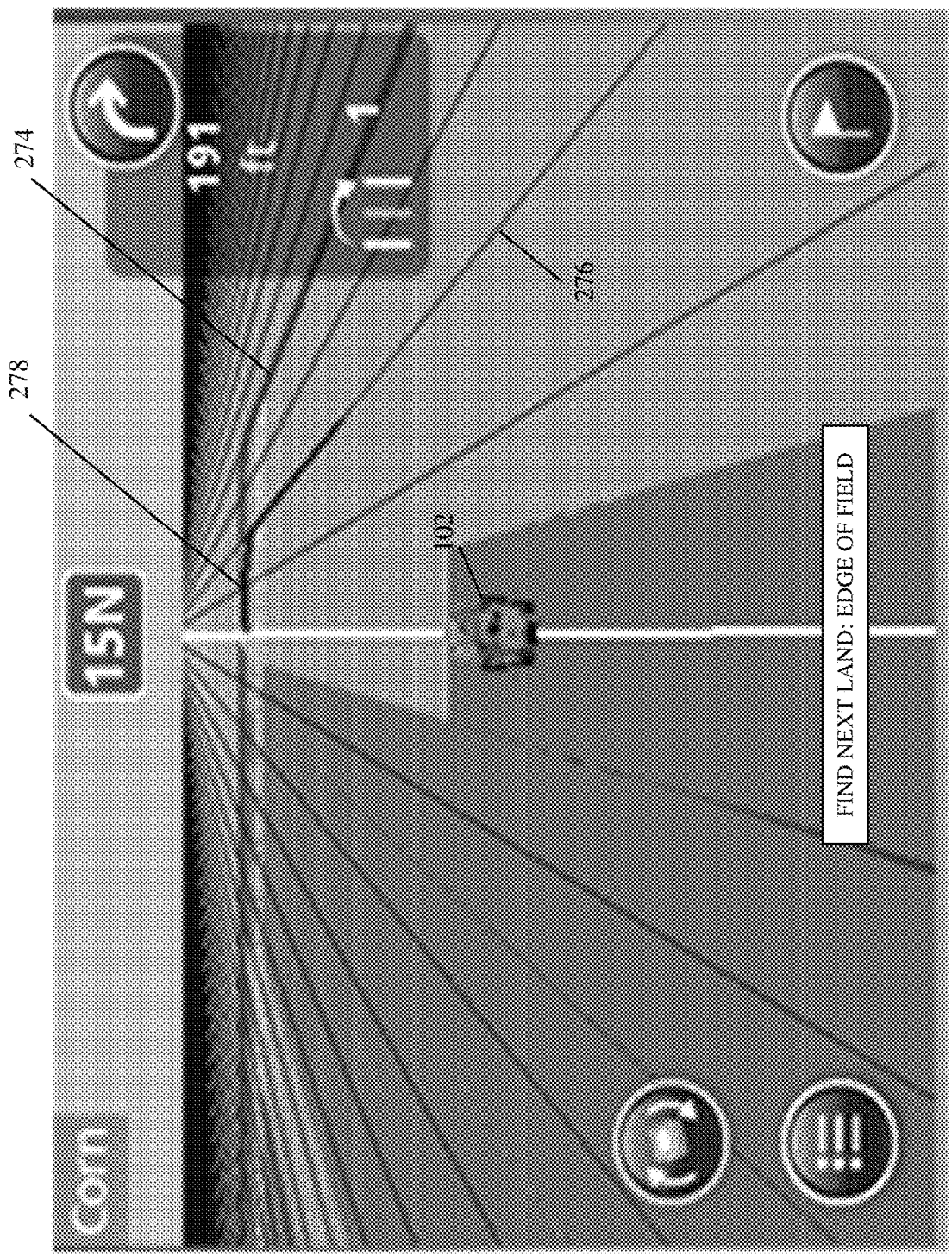

It may be that harvester 102 is near the edge of a field, in which case the number of passes in the next land identified by next land identifier 158 may be smaller than the default or detected land size. By way of example, FIG. 7O shows a field boundary at 274. Therefore, once harvester 102 finishes the pass it is on, there are only three guidance paths remaining in the field before reaching boundary 274. In that case, next land identifier 158 identifies those three passes as being the next land and next path identification system 152 identifies guidance path 276 as the next guidance path so that the turn identified at 278 can be executed by harvester 102 in order to perform a spiral out pattern to harvest the final three rows prior to reaching boundary 274.

Figure 5:
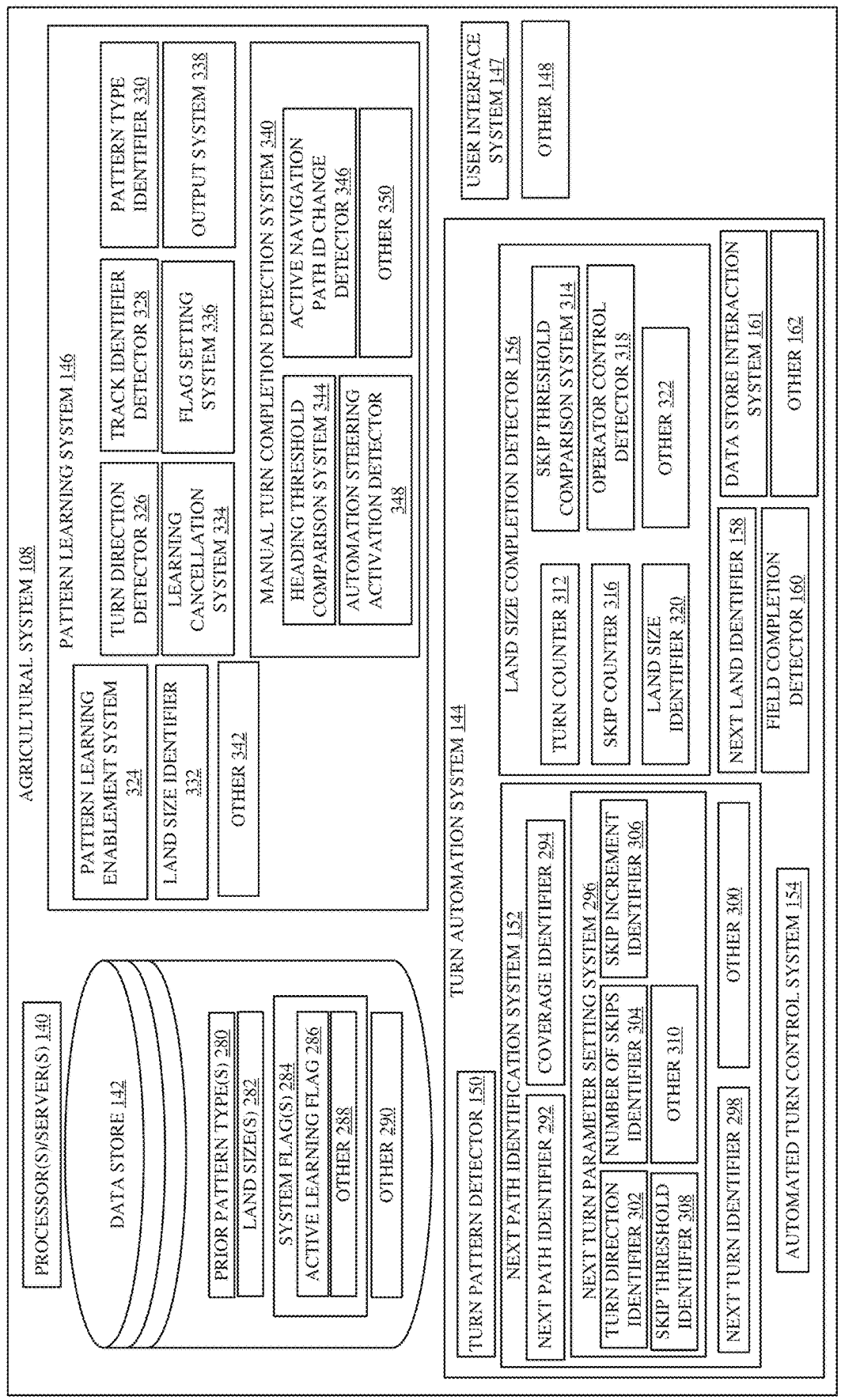
FIG. 5 is a block diagram showing one example of the agricultural system illustrated in FIG. 3, in more detail.
Figure 6A:
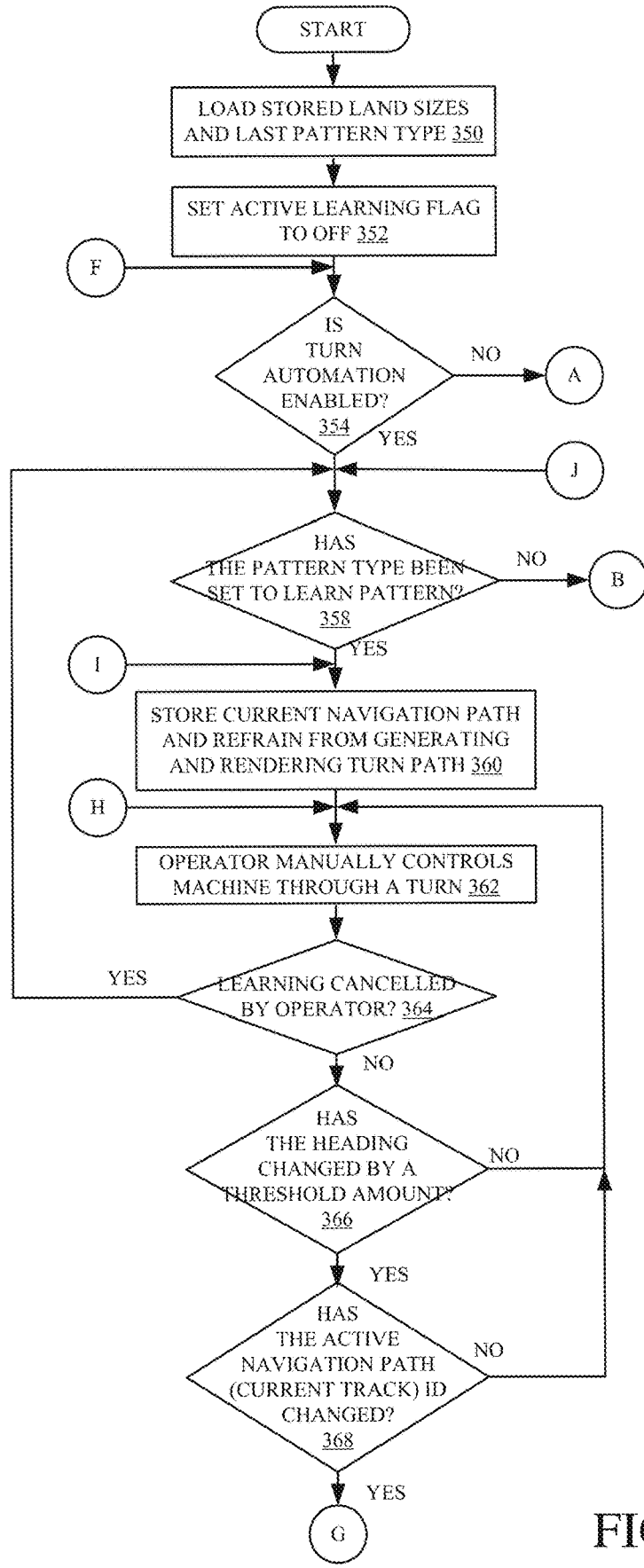
FIGS. 6A, 6B, 6C, and 6D (collectively referred to herein as FIG. 6) show a flow diagram illustrating one example of the operation of the agricultural system shown in FIG. 5.
Figure 6B:
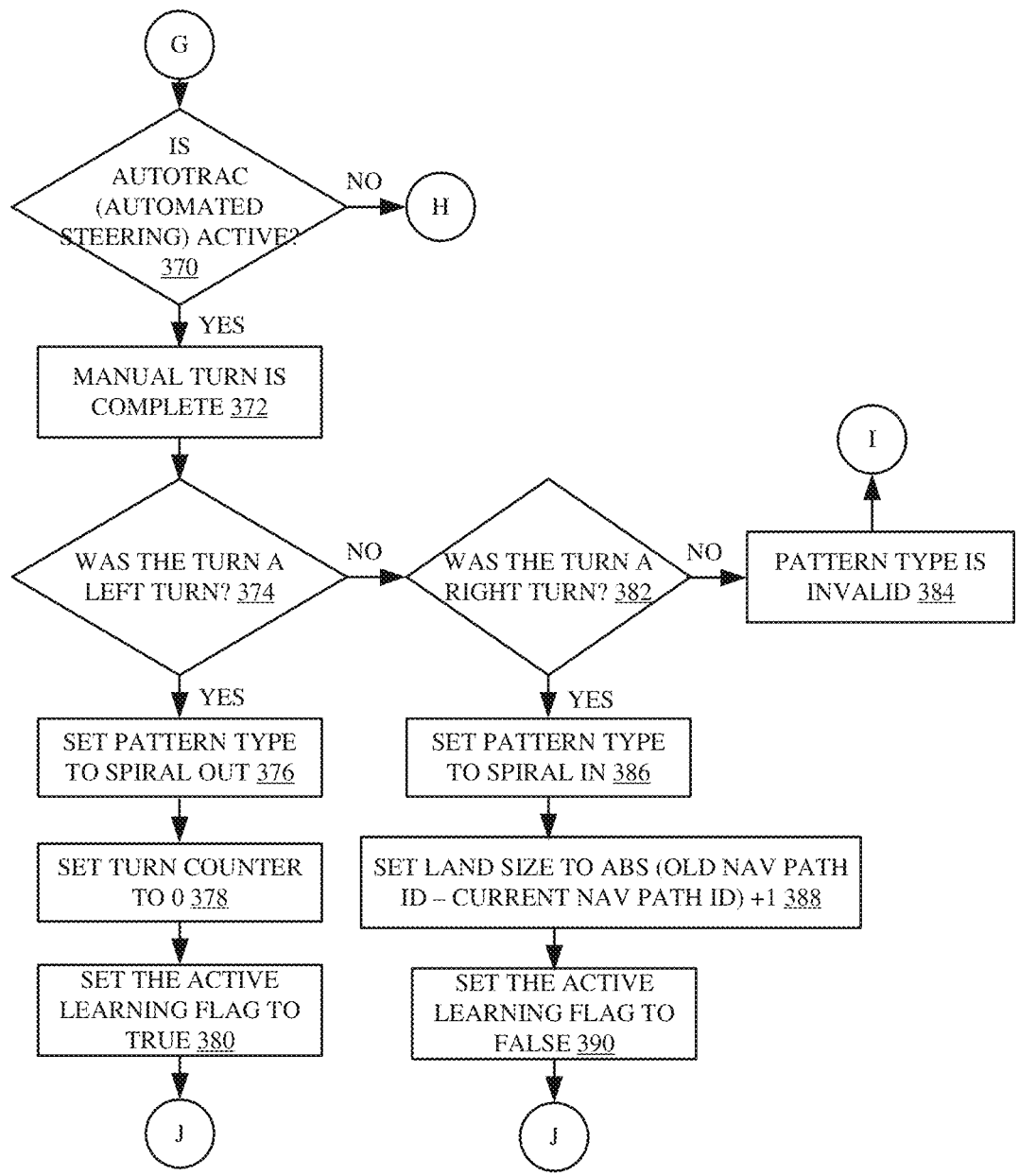
Figure 6C:
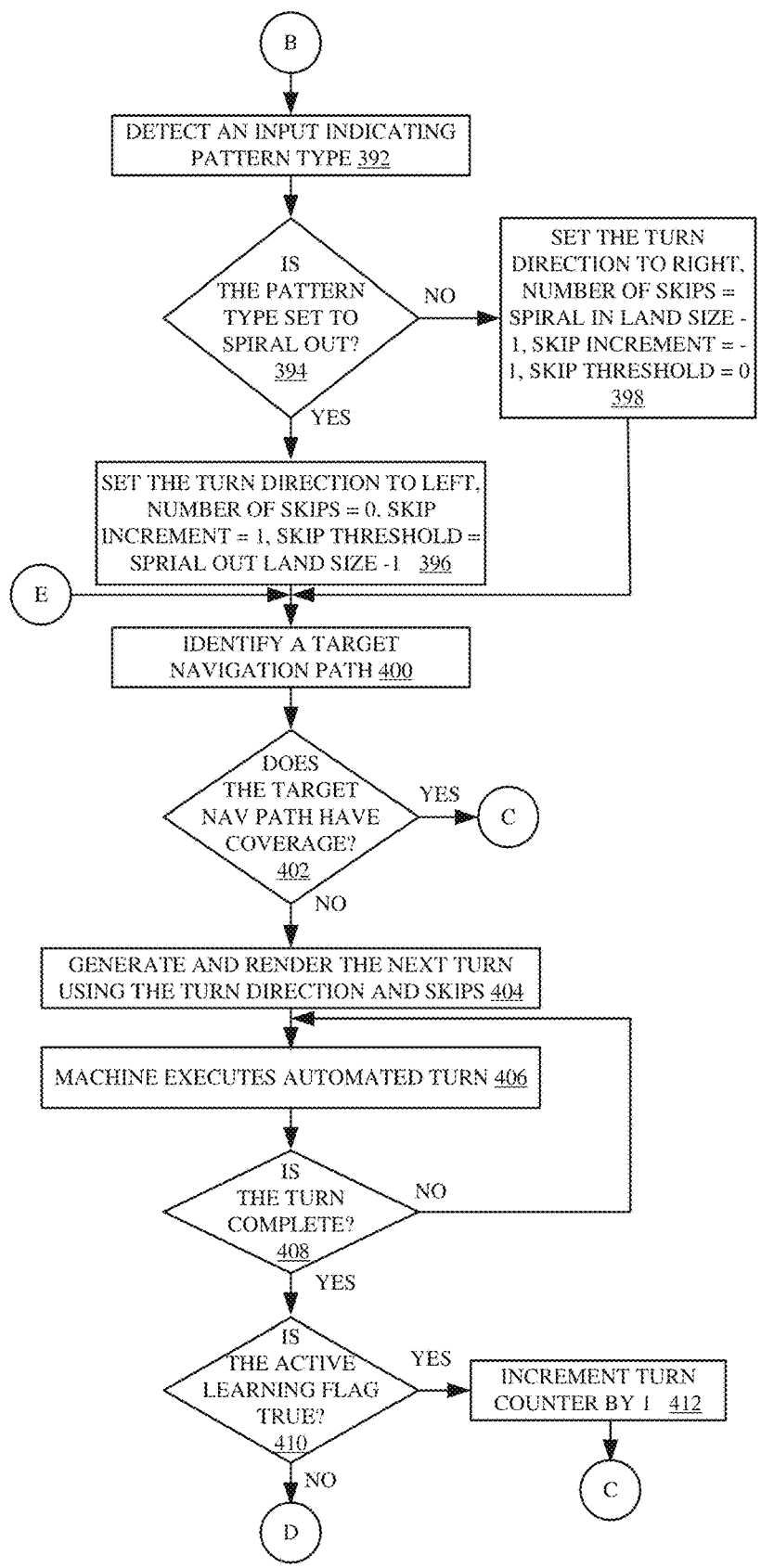
Figure 6D:
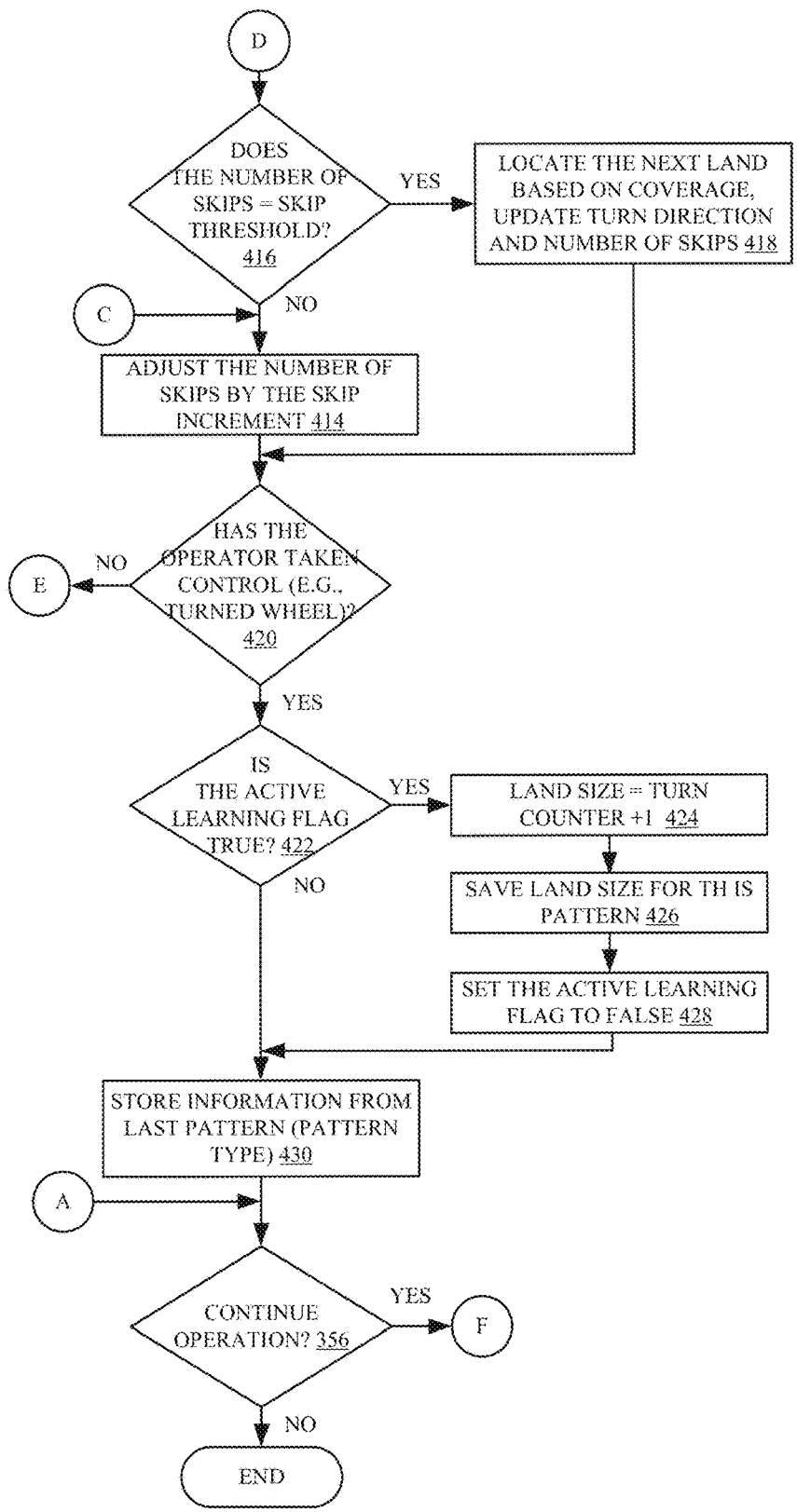

FIG. 5 shows one example of agricultural system 108 that is similar to that shown in FIG. 3, but that has some items shown in more detail. FIG. 5 shows, for example, that data store 142 can include prior pattern types 280, land sizes 282, system flags 284 (which can include active learning flags 286 and other flags 288), as well as other items 290. FIG. 5 also shows, for example, that next path identification system 152 includes next path identifier 292, coverage identifier 294, next turn parameter setting system 296, next turn identifier 298, and other items 300. Next turn parameter setting system 296 can include turn direction identifier 302, number of skips identifier 304, skip increment identifier 306, skip threshold identifier 308, and other items 310. Land size completion detector 156 can include turn counter 312, skip threshold comparison system 314, skip counter 316, operator control detector 318, land size identifier 320, and other items 322.

FIG. 5 also shows, for example, that pattern learning system 146 can include pattern learning enablement system 324, turn direction detector 326, track identifier 328, pattern type identifier 330, land size identifier 332, learning cancelation system 334, flag setting system 336, output system 338, manual turn completion detection system 340, and other items 342. Manual turn completion detection system 340 can include heading threshold comparison system 344, active path ID change detector 346, automation steering activation detector 348, and other items 350. Prior pattern types 280 can be georeferenced or otherwise indexed indictors that indicate the types of patterns that have been used by operator 166 at a particular geographic location, within a particular field, or otherwise. Land sizes 282 can indicate the land sizes that have been used by this operator, in this field, on this machine, at this geographic location, or in other ways. System flags 284 can be flags set by turn automation system 144 and/or pattern learning system 146. The flags can indicate whether active learning is enabled so that pattern learning system 146 is actively learning the turn pattern and/or land size.

In pattern learning system 146, pattern learning enablement system 324 can detect an operator 166 enabling pattern learning. The enablement can be received as an operator input through a user interface or in other ways. Turn direction detector 326 then detects the turn direction that the operator 166 controls the machine through to determine whether it is a left hand turn or a right hand turn. Track identifier detector 328 identifies the particular path through the field that the harvester is taking. Pattern type identifier 330 then identifies the type of pattern (spiral in, spiral out, etc.) based upon the turn direction and the number of tracks that have been skipped between turns. For instance, if the turn direction detector 326 identifies a left hand turn, and track identifier detector 328 detects that the operator has commenced harvesting on the next path after having skipped three paths, and if turn direction detector 326 detects another left hand turn and track identifier detector 328 identifies that the next guidance path has only skipped one path, then pattern type identifier 330 can identify the pattern as a spiral in pattern, and land size identifier 332 can identify that the land size corresponds to four travel paths. Learning cancelation system 334 allows the operator 166 to cancel learning at any time during the operation, and flag setting system 336 can be used to set various system flags 284 to desired values. Output system 338 can generate an output indicative of the learned turn pattern and land size for use by turn automation system 144 or for other reasons.

There are several ways for manual turn completion detection system 340 to detect when the operator 166 has completed controlling harvester 102 through a manual turn. Heading threshold comparison system 344 can identify when the heading has changed by a threshold number of degrees. For instance, if the heading has changed by 175 degrees, this means that the operator 166 has substantially turned harvester 102 around. Similarly, active path ID change detector 346 can detect when the guidance path identifier has changed from one path identifier value to another path identifier value. This also indicates that the operator 166 has controlled the harvester 102 through the turn. Automation steering activation detector 348 can detect when the operator enables and disables an automated steering system which is used to navigate harvester 102 along a guidance path. The operator often switches off the automated steering mechanism prior to manually turning harvester 102, and then re-enables it once the operator has established harvester 102 on the next guidance path. Thus, when the automated steering system is re-enabled after a turn is started, this may indicate that the turn is complete. Manual turn completion detection system 340 can use one or more of system 344, detector 346, and detector 348 to generate an output indicative of whether the operator 166 has completed a turn.

FIG. 5 shows that, in next path identification system 152, next path identifier 292 identifies a next path that harvester 102 will be on after the next turn has been navigated, based upon the turn pattern that has been detected. For instance, if the turn pattern is a spiral out pattern, then next path identifier 292 may identify that the next path is the next path adjacent the current guidance path that harvester 102 is harvesting. Coverage identifier 294 then analyzes the coverage in the field to determine whether the next path has already been harvested and/or whether an adjacent path has been harvested so that a grain cart can travel an already-harvested portion of the field if harvester 102 is on that next path.

Next turn parameter setting system 296 then sets the parameters for the upcoming turn. Turn direction identifier 302 identifies the direction of the turn and number of skips identifier 304 receives an input from coverage identifier 294 and next path identifier 292 to identify the number of guidance path skips that will be used in the next turn. Skip increment identifier 306 can identify whether the number of skips should be incremented or decremented on a skip counter 306 so that, on the next turn, the number of skips will be greater or less than the current number skips (depending upon whether the detected pattern is a spiral out pattern or a spiral in pattern). Skip threshold identifier 308 identifies a skip threshold that can be used by skip threshold comparison system 314 to determine whether the current land is complete. Skip threshold comparison system 314 determines whether the current number of skips has passed a threshold (such as crosses a threshold in the positive direction when the pattern is a spiral out pattern and crosses the threshold in a negative direction when the pattern is spiral in pattern. When the number of skips has crossed the threshold, this indicates that the current land will be completed after the harvester 102 has completed harvesting the current guidance path.

Based upon the turn parameters set by system 296, next turn identifier 298 identifies the next turn in terms of its direction, and how many skips will be made during the turn. Next turn identifier 298 outputs an indication of that turn to automated turn control system 154 which can generate control signals to control a steering subsystem of harvester 102 to move harvester 102 through the next turn, based upon the turn direction, the number of skips, the next guidance path and a location where the turn is to be executed. The location where the turn is to be executed can be based on a current location and heading of harvester 102 (such as from a GPS receiver or other location sensor) and the location where the current guidance path meets the headland (such as based on a map or prior sensor settings, etc.).

Land size completion detector 158 detects when harvester 102 has completely harvested the current land. Skip counter 316 counts the number of skips (they are incremented or decremented based on the skip increment identified by skip increment identifier 306). Skip threshold comparison system 314 then compares the skip count output by skip counter 316 to the skip threshold output by skip threshold identifier 308 to determine whether the number of skips has reached the skip threshold. Operator control detector 318 and land size identifier 320 can be used by pattern learning system to learn the size of the land. For instance, if the operator control detector 318 detects that the operator has taken control of harvester 102 and has navigated it through a turn (as indicated by manual turn completion detection system 340), land size identifier 320 can then identify the land size, once the turn pattern is detected and once the number of skips has been detected, as is discussed in greater detail below.

FIGS. 6A, 6B, 6C, and 6D (collectively referred to herein as FIG. 6) show a flow diagram illustrating one example of the operation of agricultural system 108 in learning a pattern and land size and in automatically controlling harvester 102 through turns to accomplish automatic harvesting of a land.

In one example, data store interaction system 161 loads the stored land sizes and the last pattern type used by this operator 166, or used on this machine 102, or otherwise, as a default pattern and land size. Loading the stored land sizes and the last pattern type is indicated by block 350 in the flow diagram of FIG. 6. Pattern learning enablement system 324 then sets the active learning flag 286 to off, if it is not already off, as indicated by block 352.

Turn automation system 144 then determines whether turn automation system 144 is enabled. This is indicated by block 354. If not, processing reverts to block 356 where, unless the operation is complete, processing continues at block 354 until the turn automation system is enabled.

Pattern learning enablement system 324 then determines whether the pattern type variable is set to "learn pattern", as indicated by block 358 in the flow diagram of FIG. 6. If not, then that means that operator 166 provides an input to turn pattern detector 150 identifying the turn pattern, or that the turn pattern is detected in other ways. Assume, for instance, that the pattern type is set to "learn pattern" at block 358. In that case, pattern learning system 146 stores the current navigation path identifier (the navigation path that harvester 102 is currently harvesting) and the next turn is not generated, because it is not yet known. Storing the current navigation path identifier and refraining from generating and rendering the turn path for the next turn is indicated by block 360 in the flow diagram of FIG. 6.

Operator 166 then manually controls harvester 102 through a turn, as indicated by block 362. It will be noted that, at any time, operator 166 can cancel the learning operation using learning cancelation system 334. Assuming, at block 364, that the operator has not canceled pattern learning, then, as operator 166 navigates the harvester 102 through the turn, manual turn completion detection system 340 determines when that turn is complete. Heading threshold comparison system determines whether the heading of machine 102 has changed by a threshold amount, indicating that the turn is complete, as indicated by block 366. If the heading has not changed by a threshold amount, processing reverts to block 362 where the operator continues to manually control the machine 102 through the turn.

Assuming that the machine heading has changed by a threshold amount, then active path change detector 346 detects the navigation path that harvester 102 is on to determine when the corresponding path identifier changes from identifying the current navigation path to a different navigation path, as indicated by block 368. If this is true, it also tends to indicate that the operator has completed the turn. Again, if the active navigation path identifier has not changed, processing again reverts to block 362 where operator 166 continues to manually control the machine 102 through the turn.

Assuming that the active navigation path identifier has changed, then automated steering activation detector 348 detects whether the operator has enabled the automated steering system which automatically follows the navigation path, as indicated by block 370. This would also indicate that the manual turn has been completed. Again, if the automated steering has not been engaged, at block 370, then processing can revert to block 362 where the user continues to manually control the harvester through the turn. Based on the heading of the machine, the navigation path identifier, and/or the engagement of the automated steering system, manual turn completion detection system 340 detects that the manual turn is complete, as indicated by block 372.

Turn direction detector 326 then detects the turn direction as indicated by block 374. For instance, based upon the way that the heading changed, the direction of the turn can be identified (e.g., whether the turn was a left turn or a right turn given the original heading of harvester 102 prior to the turn and the way the heading changes). If the turn was a left turn, then, based upon the direction that the unloading auger extends from harvester 102, the pattern type can be identified as a spiral out pattern. This is because, in order for the grain cart to follow harvester 102 on already-harvested land, and assuming that the unloading auger extends out the left side of harvester 102, a left turn must be a spiral out pattern. Identifying the pattern as a spiral out pattern is indicated by block 376 in the flow diagram of FIG. 6. Land size identifier 332 then sets a turn counter to 0 and sets the active learning flag to true indicating that the land size is still being learned. Setting the turn counter to 0 is indicated by block 378 and setting the active learning flag to true is indicated by block 380.

Returning again to block 374, assume that the turn direction detector 326 does not detect a left hand turn. Then, processing continues at block 382 where turn direction detector 326 determines whether the turn was a right hand turn. If not, then the pattern type cannot be identified, as indicated by block 384, and processing returns to block 360.

However, assume at block 382 that turn direction detector 326 detects that the turn was a right hand turn. In that case, pattern type identifier 330 identifies the pattern as a spiral in pattern, as indicated by block 386. Land size identifier 332 then sets the land size as set out in EQ. 1 below, and as indicated by block 388.

$$\text{LANDSIZE}=\text{ABS}(\text{OLD\_NAV.PATH\_ID}-\text{CURRENT NAV.PATH\_ID})+1 \qquad \text{EQ. 1}$$

Flag setting system 336 sets the active learning flag to false, indicating that the land size has already been determined, as indicated by block 390.

After processing at either block 380 or 390, pattern type identifier 330 will have identified the pattern as either a spiral in or spiral out pattern, and processing reverts to block 358 where the pattern type is no longer set to "learn pattern". Processing then continues at block 392 where the turn pattern detector 150 and turn automation system 144 detects the turn pattern either based on an operator input or based upon the output from pattern type identifier 330. Detecting an input that identifies the pattern type is indicated by block 392.

If, at block 394, turn pattern detector 150 detects that the pattern is a spiral out pattern, then turn direction identifier 302 sets the turn direction to left. Number of skips identifier 304 sets the number of skips to 0 and the skip increment identifier 306 identifies the skip increment as one. The skip threshold identifier 308 sets the skip threshold to the spiral out land size minus one. Setting these next turn parameters in this way is indicated by block 396 in the flow diagram of FIG. 6. If, at block 394, the turn pattern is not identified as spiral out, then the turn pattern is spiral in and the turn parameters are set, so the turn direction is right, the number of skips is the spiral in land size minus one, the skip increment is set to minus one, and the skip threshold is set to 0, as indicated by block 398 in the flow diagram of FIG. 6.

Given the turn parameters, next path identifier 292 identifies a target navigation path that harvester 102 will travel along on the next pass through the field. Coverage identifier 294 determines whether the target navigation path has already been harvested. Identifying the target navigation path is indicated by block 400 in the flow diagram of FIG. 6 and determining whether it has already been harvested is indicated by block 402. If the target navigation path has not been harvested, then next turn identifier 298 identifies the location of the next turn and operator interface system 147 generates an output rendering an indication of the next turn, such as the next turn indicator illustrated at 222 in FIG. 7C, or the other turn indicators in the other user interface displays. Generating and rendering the next turn using the turn direction and the number of skips identified in the turn parameters is indicated by block 404 in the flow diagram of FIG. 6.

When harvester 102 reaches the point at which to begin the turn, then automated turn control system 154 generates control signals to control harvester 102 to execute the turn, automatically, as indicated by block 406. Automatically executing the turn continues until the turn is complete, as indicated by block 408.

Land size identifier 332 then determine whether the active learning flag 286 is set to true. If so, this means that land size identifier 332 is still attempting to learn the land size for the current pattern. If the active learning flag is true, then turn counter 312 is incremented by 1. Determining whether the active learning flag is true is indicted by block 410 in the flow diagram of FIG. 6 and, if so, incrementing the turn counter by 1 is indicated by block 412. Processing then continues at block 414 where the skip counter 316 adjusts the number of skips by the skip increment (such as an increase with a spiral out pattern and a decrease with a spiral in pattern).

If, at block 410, it is determined that that active learning flag is not set to true, then that means that the land size is not currently being learned. Therefore, processing continues at block 416 where skip threshold comparison system 314 determines whether the number of skips meets the skip threshold. If the current number of skips on the skip counter 316 does meet the skip threshold, at block 416, then this means that the current land is finished and next land identifier 158 analyzes coverage information to identify where the field has already been harvested, and boundary information to identify where the field boundaries are. Next land identifier 158 can also analyze the location of other harvesters in the field to identify the next land where harvester 102 should begin harvesting. Next land identifier 158 identifies the next land and updates the turn direction and number of skips in order to perform the desired turn pattern on the newly identified land. Locating the next land and updating the turn direction and number of skips is indicated by block 418 in the flow diagram of FIG. 6.

Assuming that the operator 166 has not taken control of harvester 102 (such as by turning the steering wheel, etc.) as indicated by block 420, then processing reverts to block 400 where the next target navigation path is identified, given the newly identified land and the turn pattern.

If, at block 420, it is determined that the operator 166 has taken control of the steering wheel, than this may mean that land size identifier 332 is still attempting to learn the land size of the current turn pattern. Therefore, if the active learning flag 286 is still set to true, as determined at block 422, then land size identifier 332 sets the land size to the turn counter, plus one, as indicated by block 424. The data store interaction system 161 saves the land size for this turn pattern, as indicated by block 426, and the active learning flag is set to false, as indicated by block 428, because the land size has now been learned.

If, at block 422, it is determined that the active learning flag is not set to true, then this means that the pattern has already been detected, as has the land size, so data store interaction system 161 stores the information from the last pattern (e.g., the pattern type, the land size, etc.), as indicated by block 430.

Field completion detector 160 determines whether the field is complete, as indicated by block 356. If not, processing reverts to block 354.

It can thus be seen that the present description proceeds with respect to a system that detects a turn pattern and a land size and automatically controls the harvester to perform a harvesting operation according to the detected turn pattern and land size. When the turn pattern and/or land size are not input by an operator, the present system can automatically learn the turn pattern and land size as well.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of, the other components or items in those systems.

Also, a number of user interface displays have been discussed. The user interface displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, they can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 8:
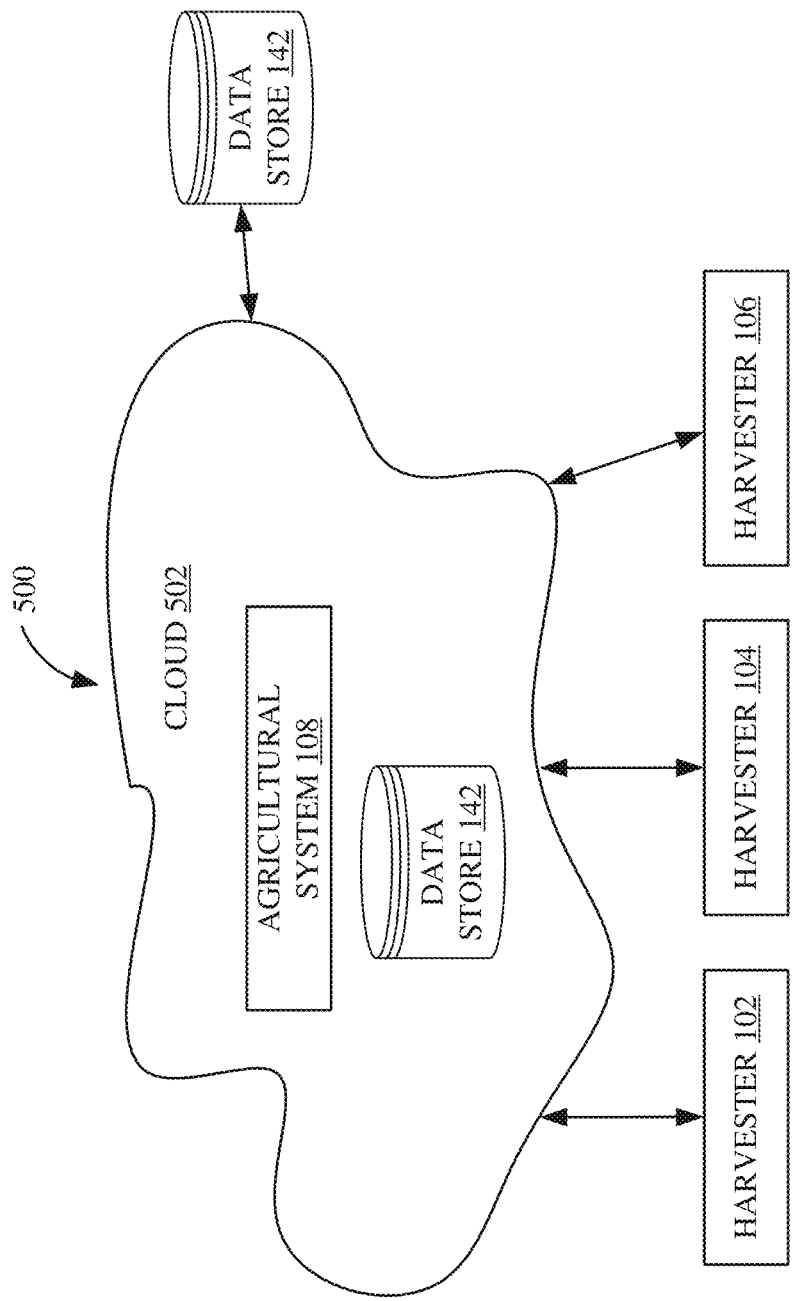
FIG. 8 is a block diagram showing one example of an agricultural system deployed in a cloud computing architecture.

FIG. 8 is a block diagram of harvesters 102, 104, and 106, shown in FIG. 1, except that they communicate with elements in a remote server architecture 700. In an example, remote server architecture 700 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 8, some items are similar to those shown in previous FIGS. and they are similarly numbered. FIG. 8 specifically shows that agricultural system 108 can be located at a remote server location 702. Therefore, harvesters 102, 104, and 106 access those systems through remote server location 702.

FIG. 8 also depicts another example of a remote server architecture. FIG. 8 shows that it is also contemplated that some elements of previous FIGS are disposed at remote server location 702 while others are not. By way of example, data store 142 can be disposed at a location separate from location 702, and accessed through the remote server at location 702. Regardless of where they are located, the items in system 108 can be accessed directly by harvesters 102, 104, and 106, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
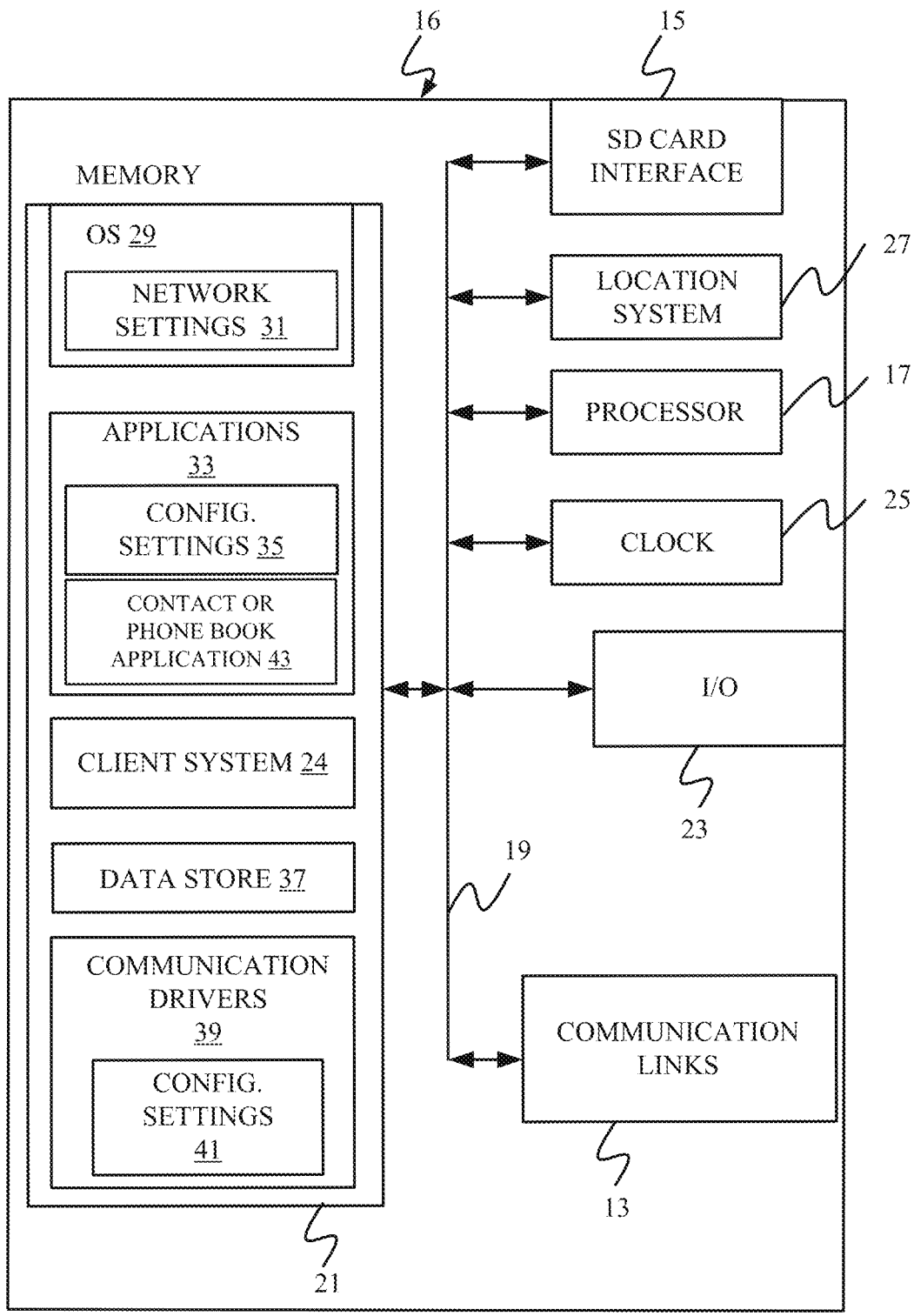
FIGS. 9, 10, and 11 show examples of mobile devices that can be used in an agricultural system.
Figure 10:
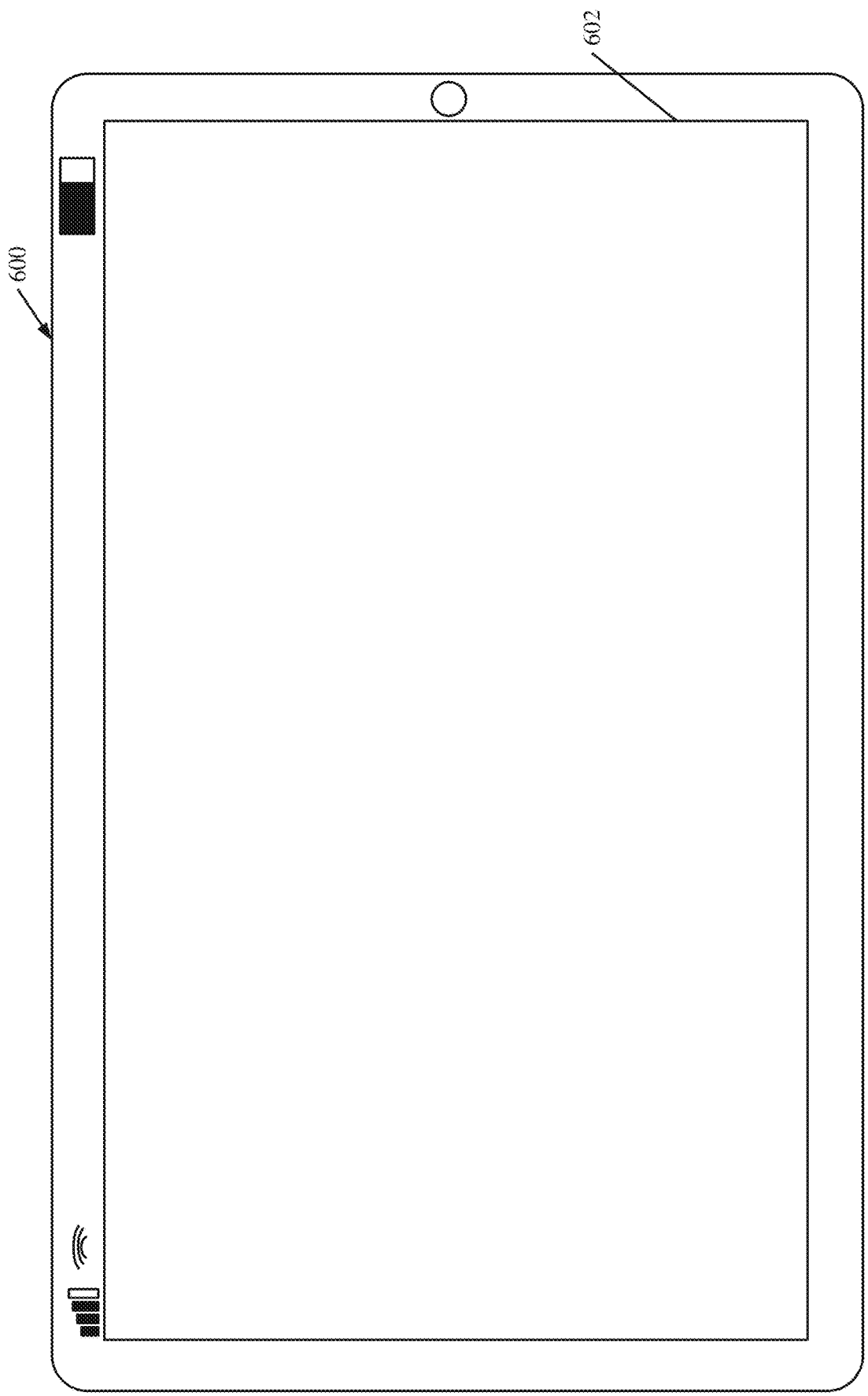
Figure 11:
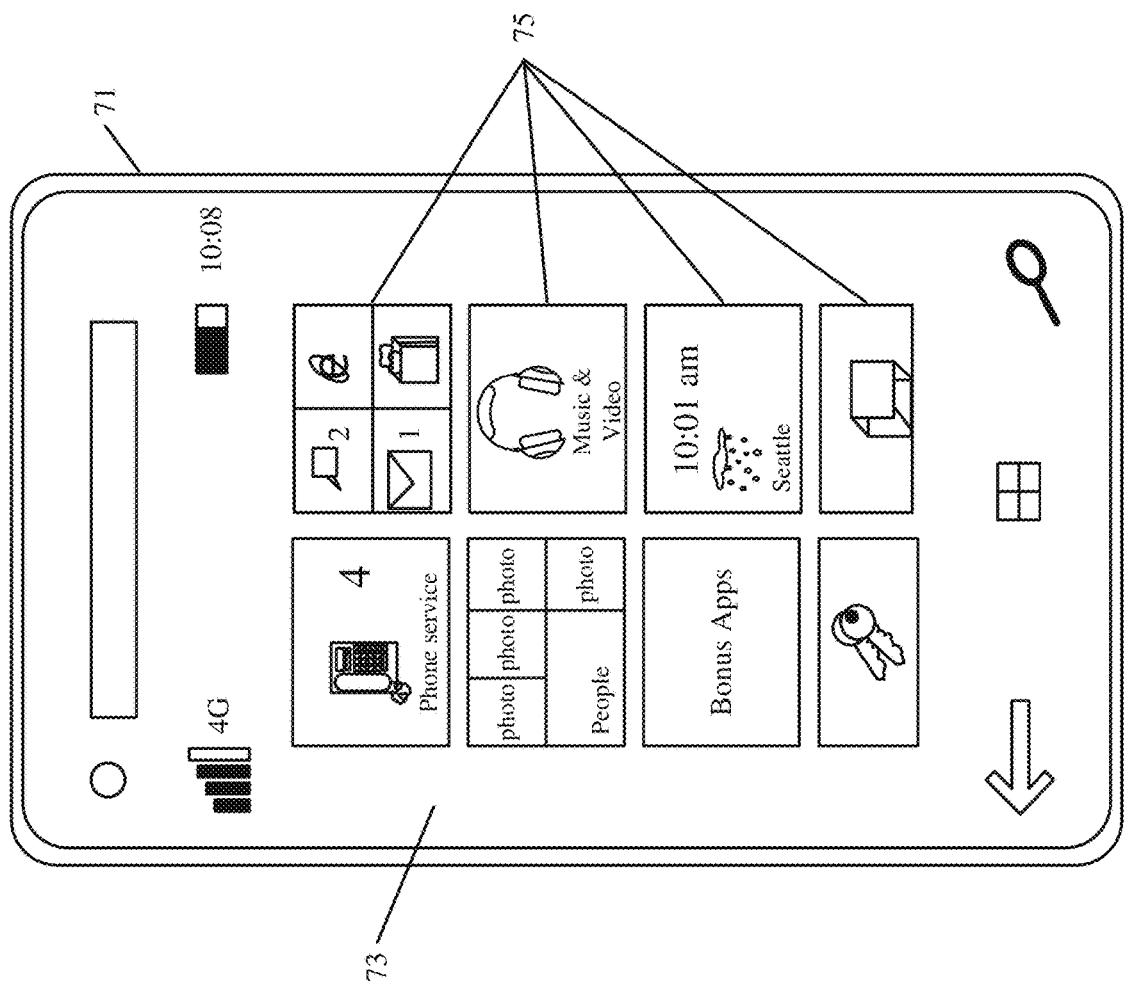

FIG. 9 is a simplified block diagram of one illustrative example of a handheld or mobile computing device that can be used as a user's or client's hand held device 16, in which the present system (or parts of it) can be deployed. For instance, a mobile device can be deployed in the operator compartment of harvesters 102, 104, and 106 for use in generating, processing, or displaying the path and position data. FIGS. 10-11 are examples of handheld or mobile devices.

FIG. 9 provides a general block diagram of the components of a client device 16 that can run some components shown in previous FIGS., that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 600. In FIG. 10, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
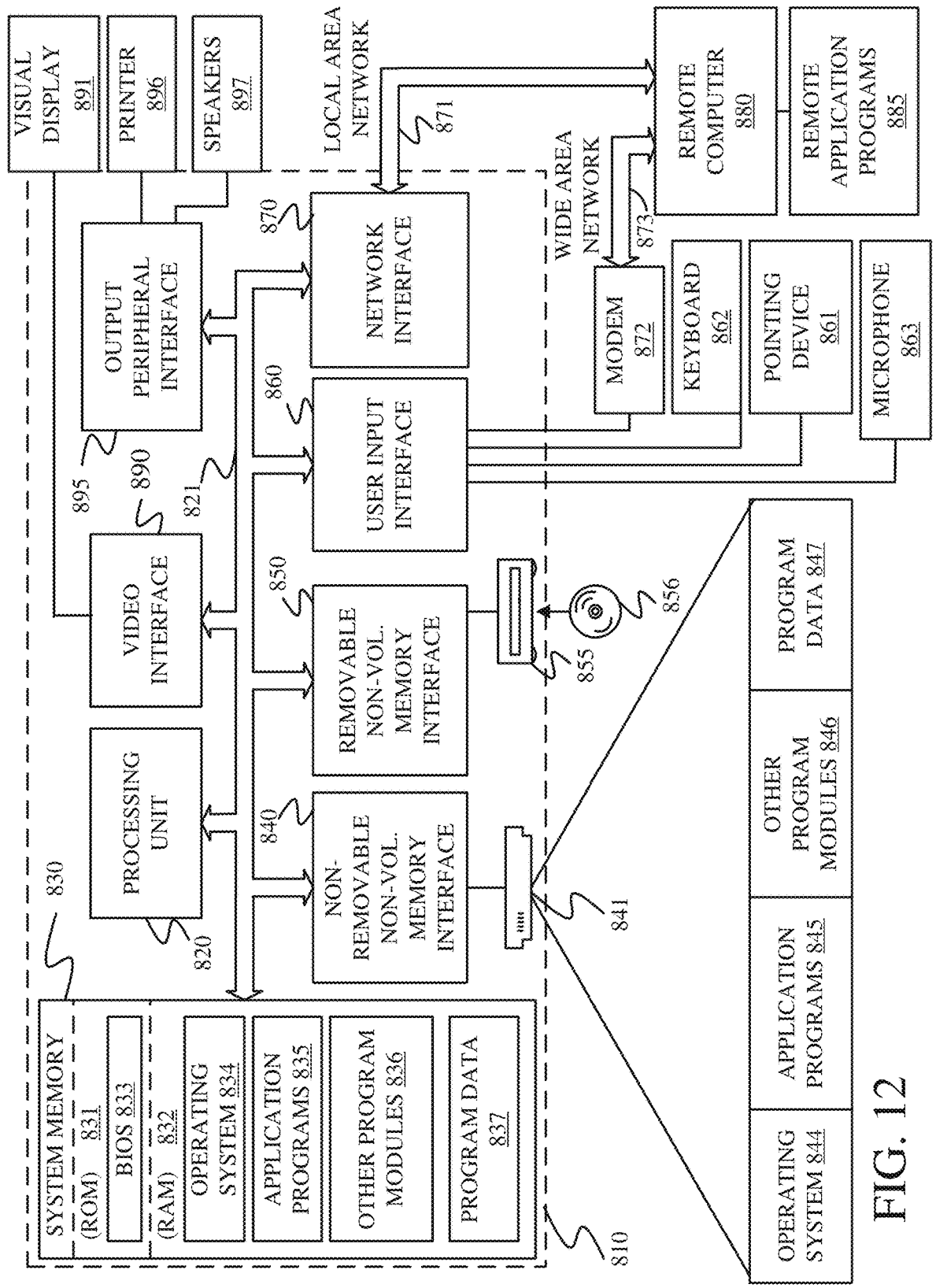
FIG. 12 shows one example of a computing environment that can be used in an agricultural system.

FIG. 12 is one example of a computing environment in which elements of previous FIGS., or parts of it, (for example) can be deployed. With reference to FIG. 12, an example system for implementing some embodiments includes a general-purpose computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network— CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 12 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural system, comprising:
at least one processor;
a data store that stores computer executable instructions which, when executed by the at least one processor, cause the at least one processor to perform steps, comprising:
detecting a turn pattern of an agricultural harvester in a field;
detecting a land size of a land in the field;
automatically identifying a next path of the agricultural harvester through the field based on the turn pattern and land size; and
generating a control signal to automatically control the harvester to execute a turn based on the identified next path.

Example 2 is the agricultural system of any or all previous examples wherein automatically identifying the next path comprises:
determining whether the next path has already been harvested; and
if so, repeating the step of automatically identifying a next path.

Example 3 is the agricultural system of any or all previous examples wherein the computer executable instructions include instructions which, when executed by the at least one processor, cause the at least one processor to perform steps comprising:
identifying when the agricultural harvester has completed harvesting the land; and
automatically identifying a next land in the field.

Example 4 is the agricultural system of any or all previous examples wherein the computer executable instructions include instructions which, when executed by the at least one processor, cause the at least one processor to perform steps comprising:
generating a control signal to automatically control the agricultural harvester to drive to the next land.

Example 5 is the agricultural system of any or all previous examples wherein detecting a turn pattern comprises:
receiving an operator turn pattern input indicative of the turn pattern and wherein detecting a land size comprises receiving an operator land size input indicative of the land size.

Example 6 is the agricultural system of any or all previous examples wherein detecting a turn pattern comprises:
automatically learning the turn pattern.

Example 7 is the agricultural system of any or all previous examples wherein automatically learning the turn pattern comprises:
identifying a first navigation path to obtain a current path identifier;
detecting a manual turn of the agricultural harvester to a second navigation path in the field; and
detecting a turn direction of the manual turn.

Example 8 is the agricultural system of any or all previous examples wherein automatically learning the turn pattern comprises:
identifying the turn pattern as a spiral in turn pattern or as a spiral out turn pattern based on the detected turn direction and based on a configuration of the agricultural harvester.

Example 9 is the agricultural system of any or all previous examples wherein detecting a land size comprises:
automatically learning the land size based on the detected turn pattern.

Example 10 is the agricultural system of any or all previous examples wherein the field has a set of navigation paths, each navigation path in the set of navigation paths is identified by a path identifier, and wherein automatically learning the land size comprises:
if the detected turn pattern is a spiral in turn pattern, then after harvesting a first navigation path and after executing a first turn in the spiral in turn pattern to begin harvesting a second navigation path, detecting the land size based on a first path identifier identifying the first navigation path and a second path identifier identifying the second navigation path.

Example 11 is the agricultural system of any or all previous examples wherein automatically learning the land size comprises:
identifying the land size as including a number of navigation paths, the number of navigation paths in the land size being an absolute value (ABS) of (the first path identifier minus the second path identifier) plus one.

Example 12 is the agricultural system of any or all previous examples wherein automatically learning the land size comprises:
if the detected turn pattern is a spiral out turn pattern, then automatically executing turns in the spiral out turn pattern;
detecting when the operator takes over manual steering of the agricultural harvester;
counting a number of turns automatically executed in navigating the spiral out turn pattern before the operator takes over manual steering of the agricultural harvester; and
detecting the land size based on the number of turns counted.

Example 13 is the agricultural system of any or all previous examples wherein automatically learning the land size comprises:
detecting the land size as the number of turns counted plus one.

Example 14 is the agricultural system of any or all previous examples wherein identifying when the agricultural harvester has completed harvesting the land comprises:
tracking a number of navigation paths skipped during the detected turn pattern;
comparing the number of navigation paths skipped to a skip threshold; and
determining that the agricultural harvester has completed harvesting the land when the number of navigation paths skipped meets the skip threshold.

Example 15 is a computer implemented method of controlling an agricultural harvester, comprising:
detecting a turn pattern of the agricultural harvester in a field;
detecting a land size of a land in the field;
automatically identifying a next path of the agricultural harvester through the field based on the turn pattern and land size; and
generating a control signal to automatically control the harvester to execute a turn based on the identified next path.

Example 16 is the computer implemented method of any or all previous examples wherein detecting a turn pattern comprises:
identifying a first navigation path to obtain a current path identifier;
detecting a manual turn of the agricultural harvester to a second navigation path in the field;
detecting a turn direction of the manual turn; and
identifying the turn pattern as a spiral in turn pattern or as a spiral out turn pattern based on the detected turn direction and based on a configuration of the agricultural harvester.

Example 17 is the computer implemented method of any or all previous examples wherein the field has a set of navigation paths, each navigation path in the set of navigation paths is identified by a path identifier, and wherein detecting a land size comprises:
if the detected turn pattern is a spiral in turn pattern, then after harvesting a first navigation path and after executing a first turn in the spiral in turn pattern to begin harvesting a second navigation path, detecting the land size based on a first path identifier identifying the first navigation path and a second path identifier identifying the second navigation path.

Example 18 is the computer implemented method of any or all previous examples wherein automatically learning the land size comprises:
if the detected turn pattern is a spiral out turn pattern, then automatically executing turns in the spiral out turn pattern;
detecting when the operator takes over manual steering of the agricultural harvester;
counting a number of turns automatically executed in navigating the spiral out turn pattern before the operator takes over manual steering of the agricultural harvester; and
detecting the land size based on the number of turns counted.

Example 19 is the computer implemented method of any or all previous examples and further comprising:
tracking a number of navigation paths skipped during the detected turn pattern;
comparing the number of navigation paths skipped to a skip threshold; and
determining that the agricultural harvester has completed harvesting the land when the number of navigation paths skipped meets the skip threshold.

Example 20 is an agricultural system, comprising:
a turn pattern detector configured to detect a turn pattern of an agricultural harvester in a field;
a land size identifier configured to detect a land size of a land in the field;
a next path identification system configured to automatically identify a next path of the agricultural harvester through the field based on the turn pattern and land size; and
an automated turn control system configured to generate a control signal to automatically control the harvester to execute a turn based on the identified next path.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An agricultural system, comprising:
at least one processor;
a data store that stores computer executable instructions which, when executed by the at least one processor, cause the at least one processor to perform steps, comprising:
detecting a turn pattern of an agricultural harvester in a field;
detecting a land size of a land in the field based on the detected turn pattern;
automatically identifying a next path of the agricultural harvester through the field based on the turn pattern and land size; and
generating a control signal to automatically control the harvester to execute a turn based on the identified next path.

2. The agricultural system of claim 1 wherein automatically identifying the next path comprises:
  determining whether the next path has already been harvested; and
  if so, repeating the step of automatically identifying a next path.

3. The agricultural system of claim 1 wherein the computer executable instructions include instructions which, when executed by the at least one processor, cause the at least one processor to perform steps comprising:
  identifying when the agricultural harvester has completed harvesting the land; and
  automatically identifying a next land in the field.

4. The agricultural system of claim 3 wherein the computer executable instructions include instructions which, when executed by the at least one processor, cause the at least one processor to perform steps comprising:
  generating a control signal to automatically control the agricultural harvester to drive to the next land.

5. The agricultural system of claim 1 wherein detecting a turn pattern comprises:
  receiving an operator turn pattern input indicative of the turn pattern.

6. The agricultural system of claim 1 wherein detecting a turn pattern comprises:
  automatically learning the turn pattern.

7. The agricultural system of claim 6 wherein automatically learning the turn pattern comprises:
  identifying a first navigation path to obtain a current path identifier;
  detecting a manual turn of the agricultural harvester to a second navigation path in the field; and
  detecting a turn direction of the manual turn.

8. The agricultural system of claim 7 wherein automatically learning the turn pattern comprises:
  identifying the turn pattern as a spiral in turn pattern or as a spiral out turn pattern based on the detected turn direction and based on a configuration of the agricultural harvester.

9. The agricultural system of claim 1 wherein the field has a set of navigation paths, each navigation path in the set of navigation paths is identified by a path identifier, and wherein automatically learning the land size comprises:
  if the detected turn pattern is a spiral in turn pattern, then after harvesting a first navigation path and after executing a first turn in the spiral in turn pattern to begin harvesting a second navigation path, detecting the land size based on a first path identifier identifying the first navigation path and a second path identifier identifying the second navigation path.

10. The agricultural system of claim 9 wherein automatically learning the land size comprises:
  identifying the land size as including a number of navigation paths, the number of navigation paths in the land size being an absolute value (ABS) of (the first path identifier minus the second path identifier) plus one.

11. The agricultural system of claim 9 wherein automatically learning the land size comprises:
  if the detected turn pattern is a spiral out turn pattern, then automatically executing turns in the spiral out turn pattern;
  detecting when the operator takes over manual steering of the agricultural harvester;
  counting a number of turns automatically executed in navigating the spiral out turn pattern before the operator takes over manual steering of the agricultural harvester; and
  detecting the land size based on the number of turns counted.

12. The agricultural system of claim 11 wherein automatically learning the land size comprises:
  detecting the land size as the number of turns counted plus one.

13. The agricultural system of claim 3 wherein identifying when the agricultural harvester has completed harvesting the land comprises:
  tracking a number of navigation paths skipped during the detected turn pattern;
  comparing the number of navigation paths skipped to a skip threshold; and
  determining that the agricultural harvester has completed harvesting the land when the number of navigation paths skipped meets the skip threshold.

14. A computer implemented method of controlling an agricultural harvester, comprising:
  identifying a first navigation path to obtain a current path identifier;
  detecting a manual turn of the agricultural harvester to a second navigation path in a field;
  detecting a turn direction of the manual turn;
  detecting a turn pattern of the agricultural harvester in a field based on the detected turn direction of the manual turn;
  detecting a land size of a land in the field;
  automatically identifying a next path of the agricultural harvester through the field based on the turn pattern and land size; and
  generating a control signal to automatically control the harvester to execute a turn based on the identified next path.

15. The computer implemented method of claim 14 wherein detecting the turn pattern comprises:
  identifying the turn pattern as a spiral in turn pattern or as a spiral out turn pattern based on the detected turn direction of the manual turn and based on a configuration of the agricultural harvester.

16. The computer implemented method of claim 14 wherein the field has a set of navigation paths, each navigation path in the set of navigation paths is identified by a path identifier, and wherein detecting a land size comprises:
  if the detected turn pattern is a spiral in turn pattern, then after harvesting the first navigation path and after executing the manual to begin harvesting the second navigation path, detecting the land size based on the first path identifier identifying the first navigation path and a second path identifier identifying the second navigation path.

17. The computer implemented method of claim 16 wherein detecting the land size comprises:
  if the detected turn pattern is a spiral out turn pattern, then automatically executing turns in the spiral out turn pattern;
  detecting, after-automatically executing turns in the spiral out pattern, when the operator takes over manual steering of the agricultural harvester;
  counting a number of turns automatically executed in navigating the spiral out turn pattern before the operator takes over manual steering of the agricultural harvester; and
  detecting the land size based on the number of turns counted.

18. The computer implemented method of claim 17 and further comprising:

tracking a number of navigation paths skipped during the detected turn pattern;
comparing the number of navigation paths skipped to a skip threshold; and
determining that the agricultural harvester has completed harvesting the land when the number of navigation paths skipped meets the skip threshold.

19. An agricultural system, comprising:
at least one processor;
a data store that stores computer executable instructions which, when executed by the at least one processor, cause the at least one processor to perform steps, comprising:
  detecting a turn pattern of an agricultural harvester in a field;
  receiving, through an interface display, an operator land size input indicative of a land size of a land in the field;
  detecting the land size of the land in the field based on the operator land size input;
  automatically identifying a next navigation path of the agricultural harvester through the field based on the detected turn pattern and detected land size; and
  generating a control signal to automatically control the agricultural harvester to execute a turn based on the identified next navigation path.

* * * * *